United States Patent [19]

Minagawa et al.

[11] 4,110,306
[45] Aug. 29, 1978

[54] STABILIZERS FOR SYNTHETIC POLYMERS COMPRISING 2,2,6,6-TETRAMETHYL-4-PIPERIDYL CARBOXYLIC ACID ESTER, A TRIPHOSPHITE, AND AN ACID PHOSPHITE OR SALT THEREOF

[75] Inventors: Motonobu Minagawa, Kosigaya; Naohiro Kubota; Toshihiro Shibata, both of Urawa, all of Japan

[73] Assignee: Argus Chemical Corporation, Brooklyn, N.Y.

[21] Appl. No.: 744,053

[22] Filed: Nov. 22, 1976

[30] Foreign Application Priority Data

Dec. 1, 1975 [JP] Japan .............................. 50-144,357

[51] Int. Cl.² .............................................. C08K 5/34
[52] U.S. Cl. ........................ 260/45.8 N; 260/45.7 PH; 260/45.8 R; 260/45.8 NT; 260/45.75 W; 260/293.64; 260/293.66
[58] Field of Search .............. 260/45.7 PH, 45.8 NT, 260/45.8 N, 293.63, 293.64, 293.66, 248 NS, 45.8 R, 45.75 W, 45.75 K; 252/403, 400 R

[56] References Cited

U.S. PATENT DOCUMENTS

| | | | |
|---|---|---|---|
| 3,640,928 | 2/1972 | Murayama et al. | 260/45.8 N |
| 3,840,494 | 10/1974 | Murayama et al. | 260/293.63 |
| 3,899,464 | 8/1975 | Murayama et al. | 260/45.8 NZ |
| 3,960,809 | 6/1976 | Ramey et al. | 260/45.8 NT |
| 4,021,432 | 5/1977 | Holt | 260/45.8 N |

FOREIGN PATENT DOCUMENTS

1,080,335   8/1967   United Kingdom.

*Primary Examiner*—V. P. Hoke

[57] ABSTRACT

Stabilizers for organic polymeric materials are provided, comprising a triphosphite, an acid phosphite, and a 2,2,6,6-tetramethyl-4-piperidyl carboxylic acid ester having the general formula:

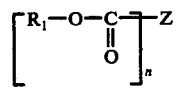

wherein:
$R_1$ is selected from the group consisting of

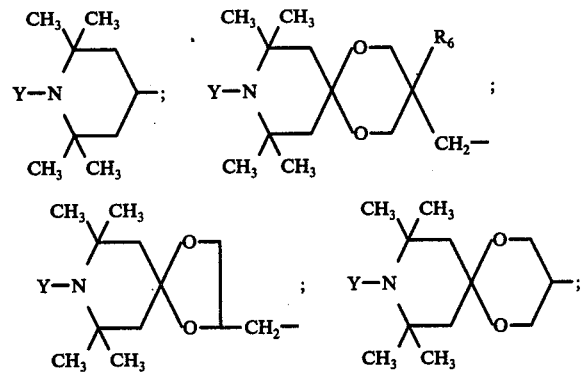

Y is selected from the group consisting of hydrogen and O;
$R_6$ is lower alkyl having from one to six carbon atoms;
$n$ is selected from the group consisting of 1, 2, 3 and 4; and
Z is an organic radical having a valence from 1 to 4, the valence positions being taken by

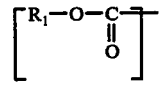

groups, and from one to about 20 carbon atoms, and selected from the group consisting of alkyl, alkenyl, alkylene, alkenylene, alkylidene; aryl, arylene, aralkyl, aralkylene, aralkylidene, alkaryl, alkarylene, alkarylidene; heterocycloalkyl, heterocycloalkylene, heterocycloalkylidene; cycloalkyl, cycloalkenyl, cycloalkylene, cycloalkenylene, cycloalkylidene, alkcycloalkyl, alkcycloalkenyl, alkcycloalkenylene, alkcycloalkylene, cycloalkalkylene, cycloalkalkyl, cycloalkalkenyl, and cycloalkalkenylene, and amino- and hydroxy-substituted such radicals.

30 Claims, No Drawings

STABILIZERS FOR SYNTHETIC POLYMERS COMPRISING 2,2,6,6-TETRAMETHYL-4-PIPERIDYL CARBOXYLIC ACID ESTER, A TRIPHOSPHITE, AND AN ACID PHOSPHITE OR SALT THEREOF

Hindered 2,2,6,6-tetraalkyl-4-carboxylic acid ester piperidine compounds have been proposed by Murayama et al U.S. Pat. No. 3,640,928 patented Feb. 8, 1972 as light and heat stabilizers for synthetic polymers, such as polyolefins, polyvinyl chloride, polyvinylidene chloride, polyurethanes, and polyamides. These compounds have the general formula:

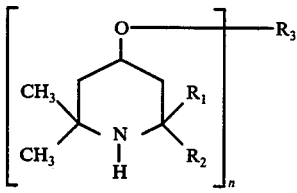

or a salt thereof.

In the above Formula:

$R_1$ and $R_2$ which may be the same or different, each are an alkyl group such as methyl, ethyl, isopropyl or dodecyl, or they form, together with the carbon atom to which they are attached, a saturated alicyclic group such as:

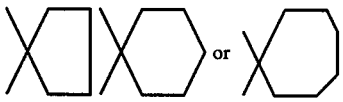

or a group of the formula

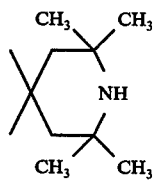

$n$ is an integer of 1 to 3 inclusive: and
$R_3$ is an acyl group.

These compounds have proved to be particularly acceptable because they do not impart a discoloration of their own to the synthetic polymer. The compounds generally employed previously have either been highly colored, such as the nickel compounds (which are normally green) and the 2-hydroxybenzophenones (which are varying shades and intensities of yellow). They also show very little tendency towards sublimation and exudation, and they have an excellent stabilizing action against both heat and light deterioration.

Consequently, the Murayama et al patent has been followed by a large number of patent and literature disclosures by Murayama et al and others of compounds including a 2,2,6,6-tetrasubstituted-4-piperidyl group attached to a base molecule of varying structures.

Murayama et al. U.S. Pat. No. 3,898,303 patented Aug. 5, 1975 propose piperidino-spiro-hydantoin derivatives having the formula:

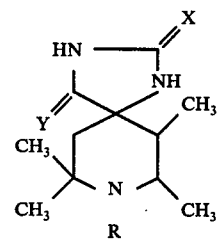

wherein

R represents an alkyl group, an alkenyl group, an alkenoyl group which may be substituted with an aryl group, a hydroxyalkyl group, an alkoxyalkyl group, an alkoxycarbonylalkyl group, an acyloxyalkyl group, a cyanoalkyl group or nitroso group, and X and Y individually represent oyxgen atom or sulfur atom.

Murayama et al. in U.S. Pat. No. 3,899,464 patented Aug. 12, 1975 disclose a variation of the piperidino spiro compounds having the formula:

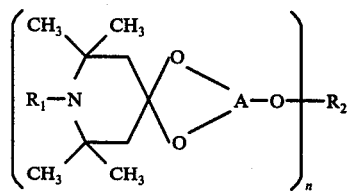

wherein $R_1$ represents hydrogen atom, an alkyl group, a substituted alkyl group, an alkenyl group, an alkynyl group, a substituted or unsubstituted aralkyl group, an aliphatic acyl group, an alkoxycarbonyl group or an aralkoxycarbonyl group, $n$ is an integer of 1 to 4;

when $n$ is 1, $R_2$ represents hydrogen atom, an aliphatic, aromatic or heterocyclic monoacyl group, an alkyl group, an alkenyl group, an alkynyl group, an aralkyl group, an aryl group, an alkoxyalkyl group, an epoxyalkyl group, an alkoxysulfonylalkyl group, N-substituted carbamoyl group, a N-substituted thiocarbamoyl group, a monovalent group from an oxoacid or group

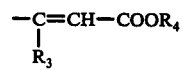

in which $R_3$ represents hydrogen atom, a lower alkyl group or phenyl group and $R_4$ represents an alkyl group;

when $n$ is 2, $R_2$ represents carbonyl group, an aliphatic or aromatic diacyl group, an alkylene group, an alkenylene group, an alkynylene group, an aralkylene group, a N-substituted dicarbamoyl group or a divalent group from an oxoacid;

when $n$ is 3, $R_2$ represents an aromatic triacyl group or a trivalent group from an oxoacid; and when $n$ is 4, $R_2$ represents an aromatic tetraacyl group, and A represents a group

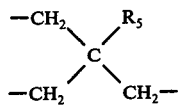

in which

R₅ represents hydrogen atom or a lower alkyl group or, when $n$ is 1, R₅ may represent together with R₂ a group

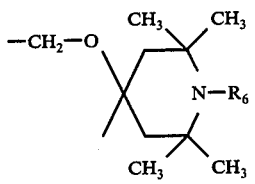

in which

R₆ represents the same group as defined in R₁ and may be the same or different from R₁, or a group

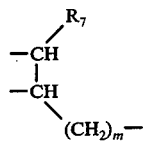

in which $m$ is 1 or 2 and R₇ represents hydrogen atom or, when $n$ and $m$ are 1, R⁷ represents methylene group together with R₂.

Murayama et al. U.S. Pat. No. 3,933,735 patented Jan. 20, 1976 propose 4-piperidone derivatives having a structure similar to the 4-piperidyl derivatives, but with a keto oxygen at the 4-position of the piperidine ring.

Murayama et al. U.S. Pat. No. 3,941,744 patented Mar. 2, 1976, disclose another variation of the piperidino spiro derivatives having the formula:

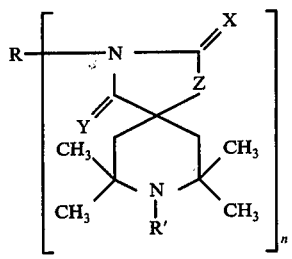

wherein

R' represents an alkyl group, a substituted alkyl group, an acyl group, an alkoxycarbonyl group, a substituted alkoxycarbonyl group, an amino group, a substituted amino group or nitroso group;

X represents oxygen atom or sulfur atom;

Y represents oxygen atom, sulfur atom or a group of the formula $=N-R''$ in which R'' is hydrogen atom, an alkyl group or a substituted alkyl group;

Z represents oxygen atom or a group of the formula $>N-R'''$ is hydrogen atom, an alkyl group or a substituted alkyl group;

$n$ is an integer of 1 through 4 inclusive; and

R represents, when $n$ is 1, an alkyl group, a substituted alkyl group, an aryl group, a substituted aryl group, a cycloalkyl group, an alkoxycarbonyl group, a substituted alkoxycarbonyl group, a substituted phosphino group or a substituted phosphinyl group, when $n$ is 2, an alkylene group, an alkenylene group, an arylene group, a substituted arylene group, an aralkylene group, an alkylenediphenylene group, a bis-(acyloxyalkylene) group, an alkylene-bis-(oxycarbonylalkyl)group, a dialkylene ether group or a diphenylene ether group, when $n$ is 3, an alkanetriyl group, a tris-(acyloxyalkylene)-group, an alkane-tris-(oxycarbonylalkyl)group or a group of the group

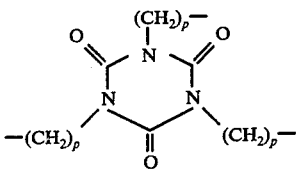

in which $p$ is an integer of 1 through 8 inclusive, and when $n$ is 4, an alkane tetrayl group, a tetrakis-(acyloxyalkylene)-group or an alkanetetrakis-(oxycarbonylalkyl) group.

Murayama et al. U.S. Pat. No. 3,940,363 patented Feb. 24, 1976 disclose a further variation in which two 2,2,6,6-tetrasubstituted-4-piperidyl groups are linked together via the ring nitrogen atom to an R' alkylene linking group, which may be interrupted with an oxygen or sulfur atom, an alkenylene group, an alkynylene group, an aralkylene group, an aliphatic diacyl group, a group having the formula:

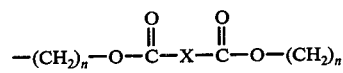

in which $n$ is an integer of 1 or 2 and X is an alkylene group, or o-, m- or p-phenylene group or the carbon atoms of CO groups may be directly joined in the absence of X or a group of the formula:

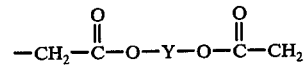

in which

Y is an alkylene group or o-, m- or p-phenylene group.

Ramey et al. U.S. Pat. Nos. 3,899,491, patented Aug. 12, 1975 and 3,920,659, patented Nov. 18, 1975, disclose alkyl alkanoate derivatives of substituted piperazines and substituted piperazinodiones. The substituted piperazines of U.S. Pat. No. 3,899,491 have the formula:

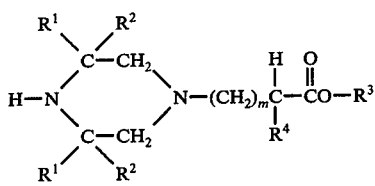

wherein

R¹ and R² are methyl or together with the carbon to which they are bound form a mono-cyclic ring system having five or six carbon atoms;

$R^3$ is an alkyl group of from one to twenty atoms;
$R^4$ is hydrogen or methyl, and
$m$ is 0 or 1.

The substituted piperazinodiones of U.S. Pat. No. 3,920,659 have the formula:

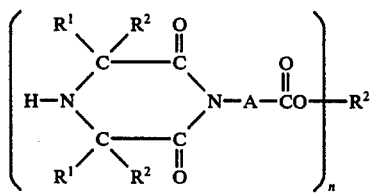

wherein $R^1$ and $R^2$ are independently of each other methyl or ethyl or together with the carbon to which they are bound form a cyclopentyl or cyclohexyl ring, which is unsubstituted or substituted with a methyl group;

$n$ is an integer of from 1 to 2;

when $n$ is 1, $R^3$ is an alkyl group of from one to 20 carbon atoms;

when $n$ is 2, $R^3$ is an alkylene group of from two to eight carbon atoms; and A is a straight or branched chain (lower)alkylene group containing from one to six carbon atoms with the limitation that the terminals of said alkylene group bear only hydrogen or one (lower) alkyl group.

Ramey et al. U.S. Pat. No. 3,920,661 patented Nov. 8, 1975 disclose dicarboxylic acids and salts in which one carboxylic acid group is esterified with a 2,2,6,6-tetrasubstituted-4-hydroxy piperidine and having the formula:

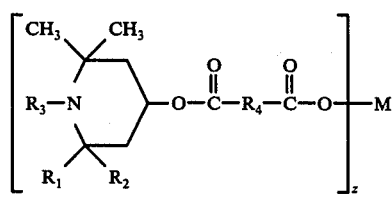

wherein $R_1$ and $R_2$ independently of each other are straight- or branched-chain alkyl having from one to six carbon atoms, or together with the carbon to which they are bound form a cyclopentyl or cyclohexyl ring, which is unsubstituted or substituted with a methyl group;

$R_3$ is hydrogen, alkyl having one to 12 carbon atoms, β-methoxyethyl, alkenyl having three or four carbon atoms, propargyl, benzyl or alkyl-substituted benzyl;

$R_4$ is straight or branched-chain alkylene having five to eight carbon atoms, or the group $(CH_2)_m Y(CH_2)_n$ wherein Y is oxygen or sulfur and $m$ and $n$ independently of each other are an integer from 1 to 3;

M is hydrogen or a metal selected from the group consisting of barium, nickel, manganese, calcium, zinc, iron, sodium, cobalt, tin, and dialkyl tin, and $z$ has a value of from 1 to 4, the value of $z$ being the same as the available valence of M.

Ramey et al. U.S. Pat. No. 3,939,163 patented Feb. 17, 1976 disclose closely similar compounds in which $R_4$ is alkylene having from one to four carbon atoms.

Randell et al. U.S. Pat. No. 3,939,170 patented Feb. 17, 1976 disclose dehydropyrindinyl sulphides, sulphoxides and sulphones having the formula:

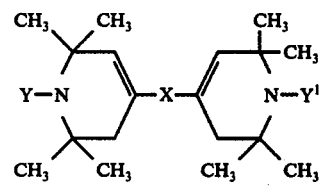

wherein

X is S, SO or $SO_2$ and Y and $Y^1$ are the same or different and each is H, OH, O— or a straight- or branched alkyl residue having from one to four carbon atoms, and salts thereof when Y and $Y^1$ are other than O—.

Randell et al. in published patent application No. B408,123 published Apr. 13, 1976 disclose substituted piperidine-4-ols having the formula:

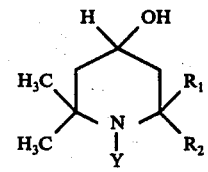

wherein $R^1$ and $R_2$ are the same or different and each is a straight- or branched alkyl residue having from one to twelve carbon atoms, or $R_1$ and $R_2$, together with the carbon atom to which they are attached, form a cycloalkyl residue having from five to twelve carbon atoms or the group:

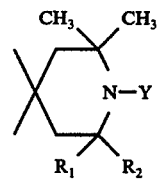

wherein $R_1$ and $R_2$ have their previous significance and Y is a straight- or branched alkyl residue having from one to twenty carbon atoms, an alkenyl or alkynyl residue having from three to twenty carbon atoms, an aralkyl residue having from seven to twelve carbon atoms or the group —$CH_2X$ wherein X is the group

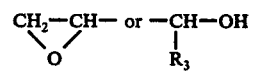

wherein $R_3$ is hydrogen, a methyl or phenyl residue, the group

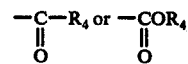

wherein $R_4$ is an alkyl residue having from one to 20 carbon atoms.

Cook U.S. Pat. No. 3,929,804 patented Dec. 30, 1975 discloses 4-piperidine acetamide compounds having the formula:

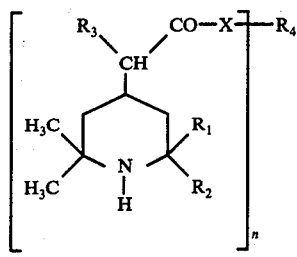

wherein $R_1$ and $R_2$ are the same or different and each is a straight- or branched alkyl residue having from one to twelve carbon atoms, or $R_1$ and $R_2$, together with the carbon atom to which they are attached form a cycloalkyl group having from 5 to 12 carbon atoms;

$R^3$ is hydrogen, a straight- or branched alkyl residue having from one to four carbon atoms, an aralkyl residue having from seven to nine carbon atoms or a cycloalkyl group having from five or six carbon atoms;

$R_4$ is a metal ion or a hydrocarbyl residue having from two to twenty carbon atoms and being either unsubstituted or substitutd by halogen or interrupted by one or more oxygen or sulphur atoms;

X is —O—, —S—, or >$NR_5$, wherein $R_5$ has the same significance as $R_3$; and n is 2, 3 or 4;

as well as salts of the amine function of the compounds of formula I.

Cook U.S. Pat. No. 3,939,168 patented Feb. 17, 1976 discloses closely similar compounds having a Y substituted on the piperidyl nitrogen atom, Y being alkyl, alkenyl, aralkyl or a group

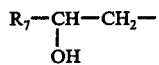

wherein $R_7$ is hydrogen, alkyl or phenyl.

In accordance with the instant invention, stabilizers for organic polymeric materials are provided, comprising a triphosphite, and acid phosphite, and a 2,2,6,6-tetramethyl-4-piperidyl carboxylic acid ester having the general formula:

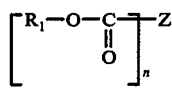

wherein:

$R_1$ is selected from the group consisting of

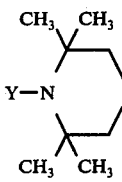 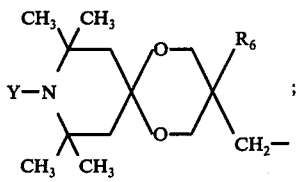

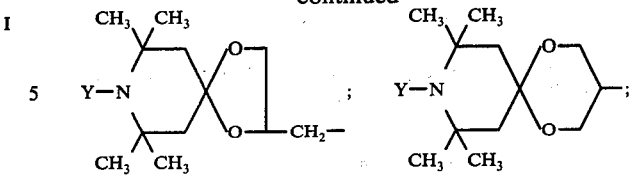

Y is selected from the group consisting of hydrogen and O;

$R_6$ is lower alkyl having from one to six carbon atoms;

n is selected from the group consisting of 1, 2, 3 and 4; and

Z is an organic radical having a valence from 1 to 4, the valence positions being taken by

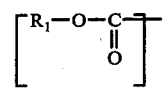

groups, and from one to about 20 carbon atoms, and selected from the group consisting of alkyl, alkenyl, alkylene, alkenylene, alkylidene; aryl, arylene, aralkyl, aralkylene, aralkylidene, alkaryl, alkarylene, alkarylidene; heterocycloalkyl, heterocycloalkylene, heterocycloalkylidene; cycloalkyl, cycloalkenyl, cycloalkylene, cycloalkenylene, cycloalkylidene, alkycycloalkyl, alkcycloalkenyl, alkcycloalkenylene, alkcycloalkylene, cycloalkalkylene, cycloalkalkyl, cycloalkalenyl, and cycloalkalkenylene, and amino- and hydroxy-substituted such radicals.

The $R_6$ alkyl have from one to six carbon atoms, and the Z alkyl and alkenyl have from one to about twenty carbon atoms. Exemplary are methyl, ethyl, n-propyl, isopropyl, n-butyl, isobutyl, tertiary butyl, secondary butyl, n-amyl, isoamyl, tertiary amyl, n-hexyl, isohexyl, secondary hexyl, tertiary hexyl, heptyl, octyl, 2-ethylhexyl, nonyl, isononyl, decyl, dodecyl, tridecyl, tetradecyl, hexacecyl, octadecyl, and eicosyl; allyl, butenyl, oleyl, ricinoleyl and linoleyl.

The Z alkylene, alkenylene and alkylidene have from one to twenty carbon atoms, and include saturated and unsaturated methylene, ethylene, propylene, butylene, amylene, hexylene, heptylene, octylene, nonylene, decylene, dodecylene, and octadecylene; vinylene, ethylidene, propylidene, butylidene, hexylidene and octylidene.

The Z aryl and arylene have from six to about twenty carbon atoms and include phenyl, napthyl and phenanthryl; phenylene, naphthylene and phenanthrylene.

The Z aralkyl and aralkylidene have from seven to about 20 carbon atoms, and include phenmethyl, phenethyl, phenpropyl, phenbutyl and napthethyl.

The Z heterocyclic alkyl, heterocycloalkylene and heterocycloalkylidene have heterocyclic rings with from three to six ring atoms of which from one to three are selected from nitrogen, sulfur and oxygen, and the remainder, if any, are carbon, with one or more alkyl, alkylene or alkylidene substituents, and include piperidine, piperazine, pyrrole, pyrazoline, pyrrollidine, melamine, isocyanuric acid, triazine, pyrazine, pyridone, pyridazine, hexahydropipyrazine, pyrimidine, and hexayhydropyrimidine.

The Z cycloalkyl, cyclolkenyl, cycloalkylene, cycloalkenylene and cycloalkylidine, cycloalkalkyl and alkcycloalkyl have from three to 20 carbon atoms and include a cycloaliphatic ring of from three to eight carbon atoms in a monocyclic or bicyclic structure, optionally with an alkyl or alkylene substituent, and include cyclopropyl, cyclobutyl, cyclopentyl, cyclohexyl, cycloheptyl, cyclooctyl, bicyclic cycloheptyl, bicyclic cyclooctyl, methyl cyclopentyl, methyl cyclohexyl, cyclohexylidene, cyclopentylidene, cyclohexylene and cycloheptylene.

Amino-substituted Z radicals include nitrilo trimethylene, ethylene diamine tetramethylene, and nitrilo dimethylene ethylene.

It will be apparent that the Z radical is the residue of a mono or polycarboxylic acid all of whose carboxylic acid groups are esterified by $R_1$ groups, which can be the same or different. The following compounds are exemplary:

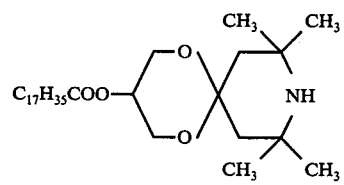

1.

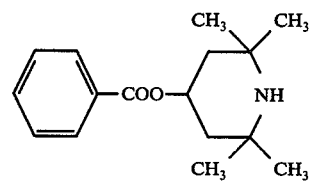

2.

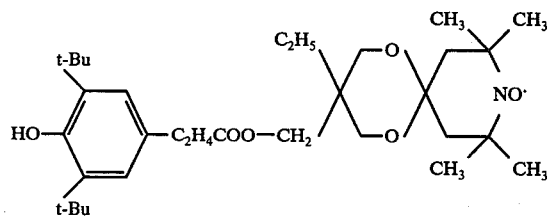

3.

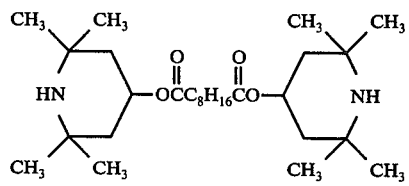

4.

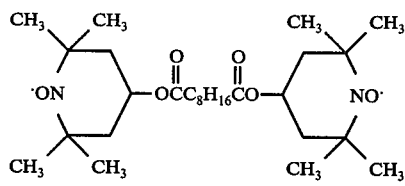

5.

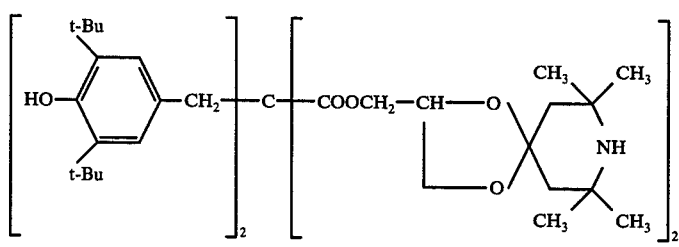

6.

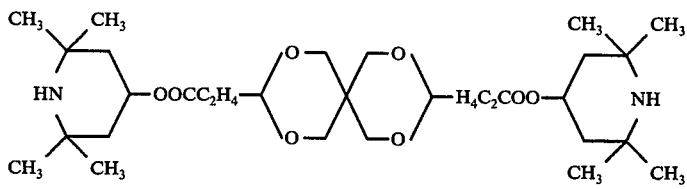

7.

8.
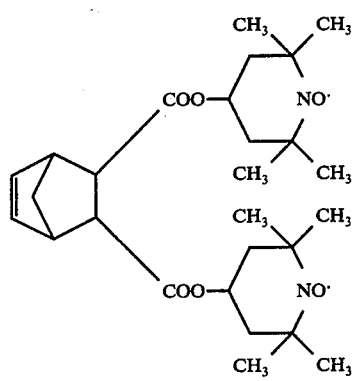
9.
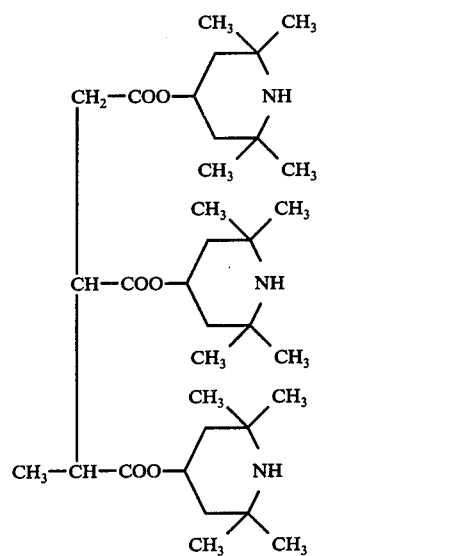
10.
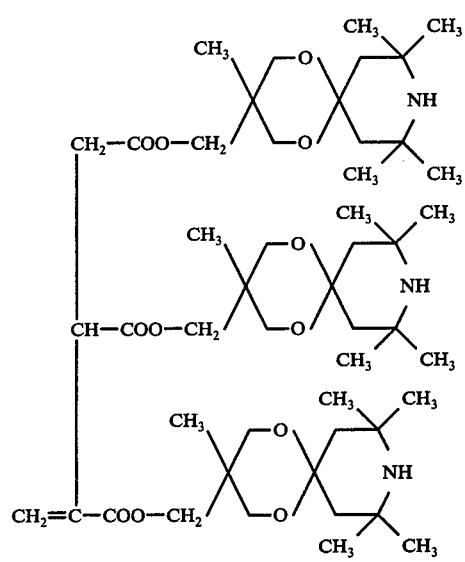
11.
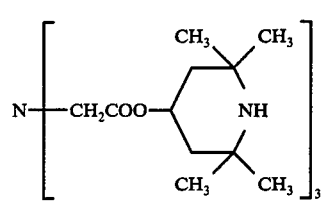

-continued
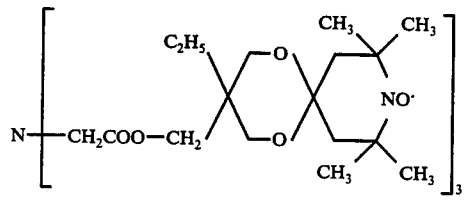
12.
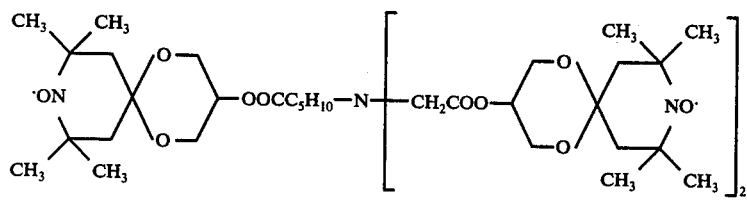
13.
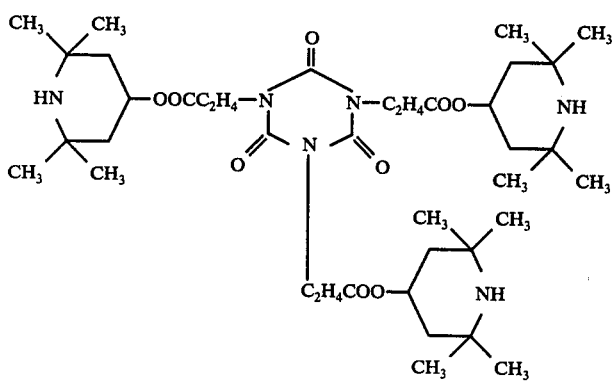
14.
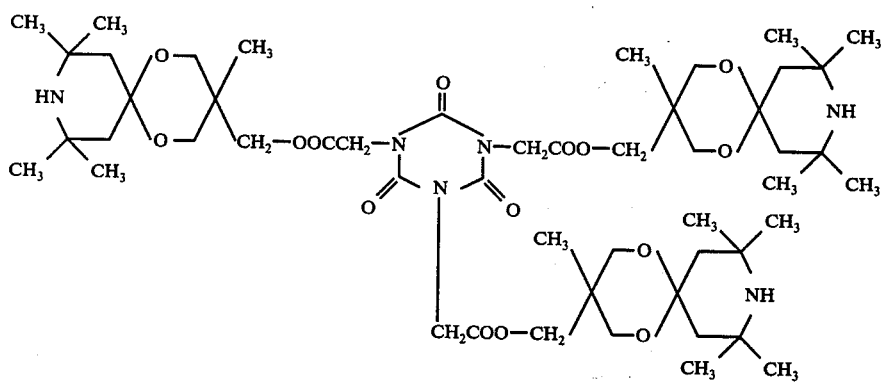
15.
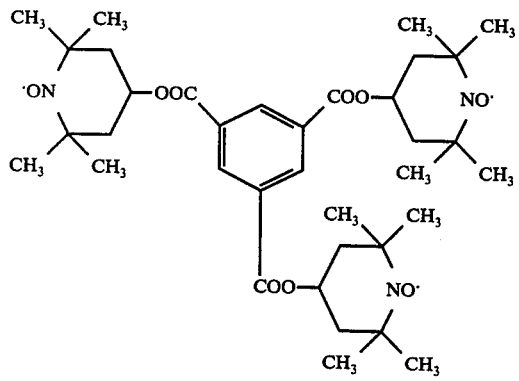
16.

17.
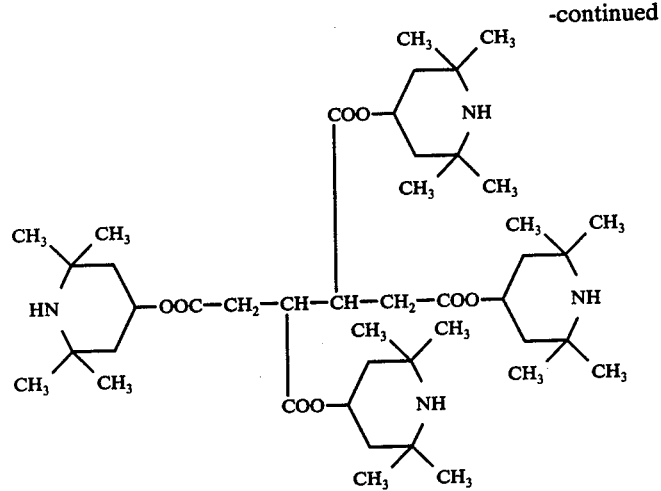
18.
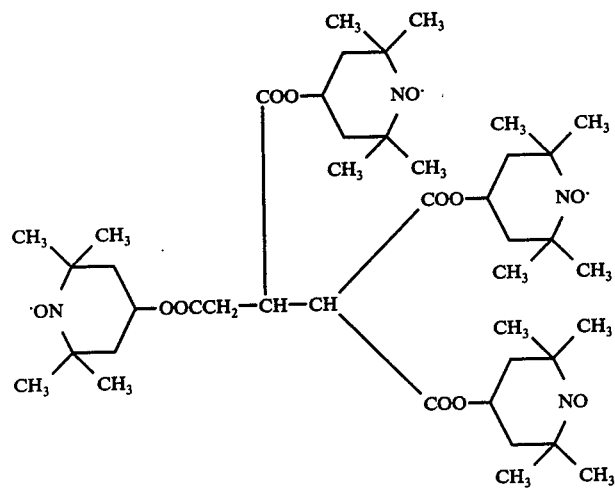
19.
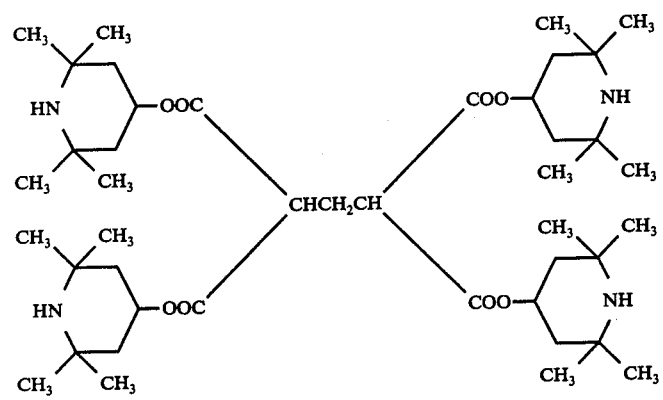
20.
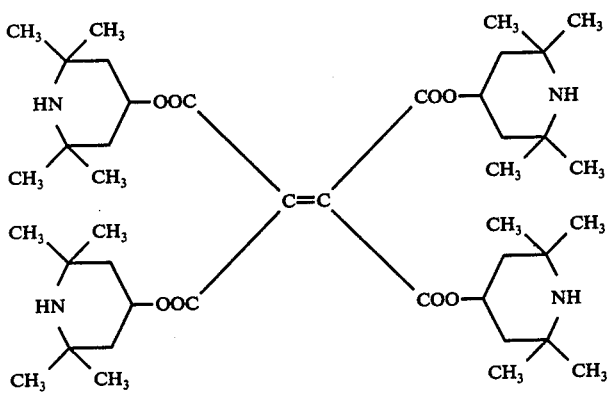

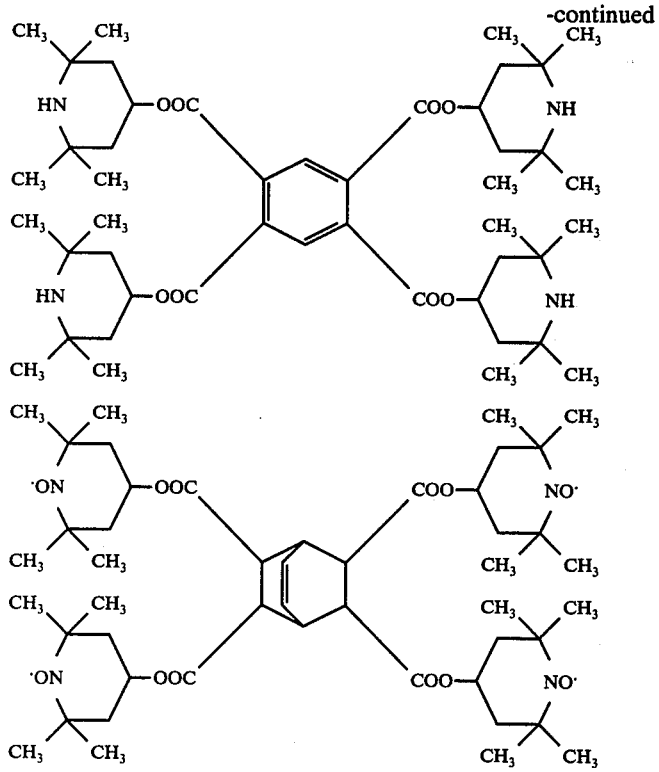

21.

22.

The 2,2,6,6-tetramethyl-4-piperidyl carboxylic acid esters are for the most part known compounds. All are readily prepared using conventional procedures. The starting materials are either available or readily synthesized without difficulty. The corresponding 2,2,6,6-tetramethyl-4-hydroxy piperidine is used as a starting material for the 2,2,6,6-tetramethyl-4-piperidyl group $R_1$. This is reacted in the presence of an organic solvent and an alkali metal alkoxide with one or more free carboxylic acid groups of the corresponsing mono or polycarboxylic acid with a Z nucleus containing one or more unesterified carboxylic acid groups. The hydroxy groups of the piperidine becomes esterified with the free carboxylic acid groups, forming the 4-piperidinyl carboxylic acid ester of the invention:

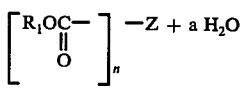

Acids which can be used include acetic, propionic, butyric, valeric, capric, caproic, lauric, myristic, palmitic, and stearic; succinic, glutaric, malic, lactic, adipic, suberic, azelaic, pimelic, citric, trimellitic, pyromellitic, butane-1,2,3,4-tetracarboxylic acid, and cylopentane tetracarboxylic acid, nitrilotriacetic, ethylene diamine tetraacetic, benzoic, terephthalic, and phthalic.

The stabilizer mixtures of the invention in addition to the 2,2,6,6-tetramethyl-4-piperidyl carboxylic acid ester include an organic triphosphite and an acid phosphite. Such combinations are complementary, and impart an enhanced resistance of the polymer to deterioration when exposed to light and/or heat. Such stabilizing effectiveness is enhanced as compared to only one or two components of the three-component stabilizer mixtures of the invention.

A variety of organic triphosphites and acid phosphites can be employed, of which the following are exemplary.

The organic triphosphite can be any organic phosphite having three or more organic radicals attached to phosphorus through oxygen. The acid phosphite can be any organic phosphite having one or two organic radicals attached to phosphorus through oxygen. These radicals can be monovalent radicals, in the case of the triphosphites, diphosphites and monophosphites.

The organic tiphosphites in which the radicals are monovalent radicals can be defined by the formula:

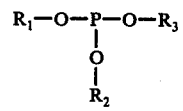

in which $R_1$, $R_2$ and $R_3$ are selected from the group consisting of alkyl, alkenyl, aryl, alkaryl, aralkyl, and cycloalkyl groups having from one to about 30 carbon atoms.

The acid phosphites are defined by the same formula, but one or two of $R_1$, $R_2$ and $R_3$ is hydrogen or a cation of a metal or ammonium.

Also included are the organic triphosphites having a bivalent organic radical forming a heterocyclic ring with the phosphorus of the type:

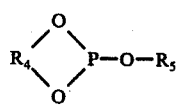

in which $R_4$ is bivalent organic radical selected from the group consisting of alkylene, arylene, aralkylene, alkarylene and cycloalkylene radicals having from two to about 30 carbon atoms, and $R_5$ is a monovalent organic radical as defined above in the case of $R_1$, $R_2$ and $R_3$.

$R_5$ is hydrogen or a cation, in the case of the acid phosphites.

Also useful organic triphosphites are mixed heterocyclic-open chain phosphites of the type:

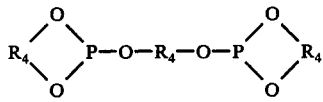

More complex triphosphites are formed from trivalent organic radicals, of the type:

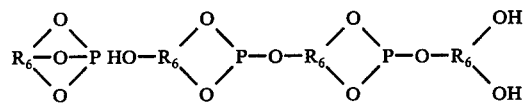

in which $R_6$ is a trivalent organic radical of any of the types of $R_1$ to $R_5$, inclusive, as defined above.

A particularly useful class of complex triphosphites are the tetraoxadiphosphaspiro undecanes of the formula:

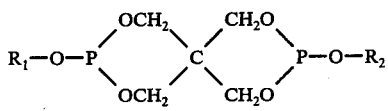

wherein $R_1$ and $R_2$ are selected from the group consisting of aryl, alkyl, aryloxyethyl, alkyloxyethyl aryloxyethoxyethyl, alkyloxyethoxyethyl and alkyloxypolyethoxyethyl having from about one to about thirty carbon atoms.

In the case of the acid phospites, one or both of $R_1$ and $R_2$ is also hydrogen or a cation.

An espcially preferred class of organic triphosphites and acid phosphites have a bicyclic aromatic group attached to phosphorus through oxygen, with no or one or more phenolic hydroxyl groups on either or both of the aromatic rings. These phosphites are characterized by the formula:

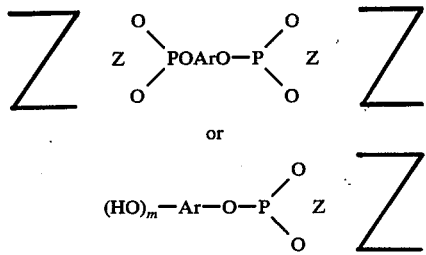

in which Ar is a mono or bicyclic aromatic nucleus and m is an integer of from 0 to about 5. Z is one or a plurality of organic radicals as defined above for $R_1$ to $R_6$, taken singly or together in sufficient number to satisfy the valences of the two phosphite oxygen atoms.

One or both Z radicals is also hydrogen, in the case of the acid phosphites, and can include additional bicyclic aromatic groups of the type $(HO)_m$—Ar.

The cation in the case of acid phosphites can be a metal, such as an alkali metal, for instance, sodium, potassium or lithium; an alkaline earth metal, for instance, barium, calcium, or a nontoxic polyvalent metal, such as magnesium, tin and zinc.

Usually, the triphosphites and acid phosphites will not have more than about sixty carbon atoms.

Exemplary triphosphites are monophenyl di-2-ethylhexyl phosphite, diphenyl mono-2-ethylhexyl phospite, di-isoocyl monotolyl phosphite, tri-2-ethylhexyl phosphite, phenyl dicyclohexyl phosphite, phenyl diethyl phosphite, triphenyl phosphite, tricresyl phosphite, tri(-dimethylphenyl)phosphite, trioctadecyl phosphite, triisooctyl phosphite, tridodecyl phoshite, isooctyl diphenyl phosphite, diisooctyl phenyl phosphite, tri(t-octylphenyl) phosphite, tri(t-nonylphenyl) phosphite, benzyl methyl isopropyl phosphite, butyl dicresyl phosphite, isooctyl di(octylphenyl) phosphite, di(2-ethylhexyl) (isooctylphenyl)phosphite, tri(2-cyclohexylphenyl)phosphite, tri-α-naphthyl phosphite, tri(phenylphenyl)phosphite, tri(2-phenylethyl)phosphite, ethylene phenyl phosphite, ethylene t-butyl phosphite, ethylene isohexyl phosphite, ethylene isooctyl phosphite, ethylene cyclohexyl phosphite, 2-phenoxy-1,3,2-dioxaphosphorinane, 2-butoxy-1,3,2-dioxyphosphorinane, 2octoxy-5,5-dimethyl-dioxaphosphorinane, and 2-cyclohexyloxy-5,5diethyl dioxaphosphorinane.

Exemplary pentaerythritol triphosphites are 3,9-diphenoxy-2,4,8,10-tetraoxa-3,9-diphosphaspiro-(5,5)-undecane (diphenyl-pentaerythritoldiphosphite), 3,9-di(decyloxy)-2,4,8,10-tetraoxa-3,9-diphosphaspiro (5,5)-undecane, 3,9-di(isodecyloxy)-2,4,8,10-tetraoxa-3,9-diphosphaspiro-(5,5)-undecane, 3,9-di(octadecyloxy)-2,4,8,10-tetraoxa-3,9-diphosphaspiro-(5,5)-undecane, 3-phenoxy-9-isodecyloxy-2,4,8,10-tetraoxa-3,9-diphosphaspiro-(5,5)-undecane, 3,9-di(methoxy)-2,4,8,10-tetraoza-3,9-diphosphaspiro-(5,5undecane,3,9-di(lauryloxy)-2,4,8,10-tetraoxa-3,9-diphosphaspiro-(5,5)-undecane, 3,9-di-p-tolyloxy-2,4,8,10 tetraoxa-3,9-diphosphaspiro-(5,5)-undecane; 3,9-di(methoxyethyloxy)-2,4,8,10-tetraoxa-3,9-diphosphaspiro-(5,5)-undecane; 3-methoxyethyloxy-9-isodecyloxy-2,4,8,10-tetraoxa-3,9-diphosphaspiro-(5,5)-undecane; 3,9-di(ethoxyethyloxy)-2,4,8,10-tetraoxa-3,9-diphosphaspiro-(5,5)-undecane; 3,9-di(ethoxyethyloxy)-2,4,8,10-tetraoxa-3,9-diphosphaspiro-(5,5)-undecane; 3-methoxyethyloxy-9-butoxyethyloxy-2,4,8,10-tetraoxa-3,9diphosphaspiro-(5,5)-undecane; 3,9-di (methoxyethoxyethyloxy)-2,4,8,10-tetraoxa-3,9-diphosphaspiro-(5,5)-undecane; 3,9-di(butoxyethoxyethyloxy)-2,4,8,10-tetraoxa-3,9-diphosphaspiro-(5,5)-undecane; 3,9-di(methoxyethoxyethoxyethyloxy)-2,4,8,10-tetraoxa-3,9-diphosphaspiro-(5,5)-undecane; 3,9-di(methoxy(polyethoxy)ethyloxy)-2,4,8,10-tetraoxa-3,9-diphosphaspiro (5,5)-undecane (where the (polyethoxy) ethyloxy group has an average molecular weight of 350) 3,9di(methoxy (polyethoxy)ethyloxy)-2,4,8,10-tetraoxa-3,9-diphosphaspiro-(5,5)-undecane (where the (polyethoxy)ethyloxy group has an average molecular weight of 550).

Exemplary of the bis aryl triphosphites are: bis(4,4'-thio-bis (2-tertiary butyl-5-methyl-phenol)) isooctyl phosphite, mono (4,4'-thio-bis (2-tertiary-butyl-5methyl-phenol)) di-phenyl phosphite, tri-(4,4'-n-butylidenebis(2-tertiary-butyl-5-methyl-phenol)) phosphite, (4,4'-benzylidene-bis (2-tertiary-butyl-5-methylphenol)) diphenyl phosphite, isooctyl 2,2'-bis (-parahydroxyphenyl)propane phosphite, decyl 4,4'-n-butylidene-bis (2-tertiary-butyl-5-methylphenol)phosphite, tri-4,4'-thiobis(2-tertiary-butyl-5-methylphenol) phosphite, 2-ethylhexyl-2,2'-methylene-bis(4-methyl-6,1'-methylcyclohexyl)phenol phosphite, tri (2,2'-bis-(parahydroxyphenyl) propane) phosphite, tri (4,4'-thio-bis(2-tertiary-butyl-5methyl-phenol) phosphite, isooctyl-(2,6-bis(2'-hydroxy-3,5-dinonylbenzyl)-4-nonyl phenyl)) phosphite, tetra-tridecyl 4,4'-n-butylidene-bis(2-tertiary butyl-5-methyl penyl) diphosphite, tetra-isooctyl 4,4'-thiobis (2-tertiary butyl-5-methyl phenyl diphosphite, 2,2'-methylene-bis (4-methyl 6,1'-methyl cyclohexyl phenyl)polyphosphite, isooctyl-4,4'-isopropylidene-bis-phenyl-polyphosphite, 2-ethylhexyl-2,2'-methylene-bis(4-methyl-6,1'-methyl-cyclohexyl) phenyl triphosphite, tetra-tridecyl-4,4'-oxydiphenyl diphosphite, tetra-n-dodecyl-4,4'-n-butylidene bis (2-tertiary-butyl-5-methylphenyl) diphosphite, tetratridecyl-4,4'-isopropylidene bisphenyl diphosphite, hexa-tridecyl butane-1,1,3-tris (2'-methyl-5'-tertiary-butylphenyl-4'-)triphosphite.

Exemplary acid phosphites are di(phenyl)phosphite, monophenyl phosphite, mono-(diphenyl)phosphite, dicresyl phosphite, di-(o-isooctylphenyl) phosphite, di(p-ethylhexylphenyl)phosphite, di(p-t-octylphenyl)-phosphite, di(dimethylphenyl) phosphite, di-n-butyl phosphite, di-2-ethylhexyl phosphite, mono-2-ethylhexyl phosphite, diisooctyl phosphite, monoisooctyl phosphite, monododecyl phosphite, 2-ethylhexyl phenyl phosphite, 2-ethylhexyl(n-octylphenyl) phosphite, monocyclohexyl phosphite, dicyclohexyl phosphite, di(2-cyclohexyl phenyl) phosphite, di-α-naphthyl phosphite, diphenyl phenyl phosphite, di(diphenyl) phosphite, di-(2-phenyl ethyl) phosphite, dibenzyl phosphite, monobenzyl phosphite, n-butyl cresyl phosphite and didodecyl phosphite, cresyl phosphite, t-octylphenyl phosphite, ethylene phosphite, butyl cresyl phosphite, isooctyl monotolyl phosphite and phenyl cyclohexyl phosphite.

Exemplary of the bis aryl acid phosphites are: bis (4,4'-thio-bis (2-tertiary-butyl-5-methyl-phenol)) phosphite, (4,4'-thio-bis (2-tertiary-butyl-5-methyl-phenol)) phenyl phosphite, bis (4,4'-n-butylidene-bis (2-tertiary-butyl-5-methyl-phenol)) phosphite, amono (4,4'-benzylidene-bis (2-tertiary-butyl-5-methyl-phenol)) phosphite, mono (2,2'-bis-(-parahydroxyphenyl)propane) phosphite, mono (4,4'-n-butylidene-bis (-2-tertiary-butyl-5-methyl-phenol) phosphite, bis (4,4'-thiobis (2-tertiary-butyl-5-methylphenol)) phosphite, mono-2-ethylhexyl-mono-2,2'methylene-bis (4-methyl-6,1'methylcyclohexyl) phenol phosphite, bis(2,2'-bis-(parahydroxyphenyl)propane) phosphite, monoisooctyl mono(4,4'thio-bis (2-tertiary-butyl-5-methyl-phenol)) phosphite, isooctyl-(2,6-bis (2'-hydroxy-3,5-dinonylbenzyl)-4-nonyl phenyl)) phosphite, tri-tridecyl 4,4'-n-butylidene-bis (2-tertiary-butyl-5-methyl phenyl) diphosphite, triiooctyl 4,4'-thiobis (2-tertiary-butyl-5-methyl phenyl) diphosphite, bis (2,2'-methylene-bis (4-methyl-6,1'-methyl cyclohexyl phenyl)) phosphite, isooctyl-4,4'-isopropylidene-bis-phenyl phosphite, monophenyl mono (2,2'-methylene-bis (4-methyl-6,1'6,1'-methyl-cyclohexyl)) triphosphite, di-tridecyl-4,4'-oxydiphenyl diphosphite, di-n-dodecyl-4,4'-n-butylidene bis (2-tertiarybutyl-5-methylphenyl) diphosphite, di-tridecyl-4,4'-isopropylidene bisphenyl diphosphite, tetra-tridecyl butane-1,1,3-tris (2°-methyl-5'-tertiary-butylphenyl-4-) triphosphite.

The 2,2,6,6-tetrasubstituted-4-piperidyl carboxylic acid ester-triphosphite-acid phosphite-containing stabilizer compositions of the invention are effective stabilizers to enhance the resistance to deterioration due to heat and/or light of synthetic polymeric materials which are susceptible to such degradation, including polyolefins such as low density polyethylene, high density polyethylene, polypropylene, polybutylene, polyisobutylene, polypentylene, and polyisopentylene, polystyrene; polydienes, such as polybutadiene and polyisoprene; and copolymers of olefins and dienes with other ethylenically and acetylenically unsaturated monomers, such as ethylene-propylene copolymers, ethylene-butene copolymers, ethylene-pentene copolymers, ethylene-vinyl acetate copolymers, styrene-butadiene copolymers, acrylonitrilestyrene-butadiene copolymers, synthetic rubbers of all types, such as polychloroprene; polyvinyl halides, including polyvinyl chloride homopolymer, polyvinylidene chloride; and copolymers of vinyl chloride and vinylidene chloride; vinyl chloride and vinyl acetate; vinylidene chloride and vinyl acetate; and other ethylenically unsaturated monomers; polyacetals such as polyoxymethylene and polyoxyethylene; polyesters such as polyethylene glycol-terephthalic acid ester polymers; polyamides such as polyepsiloncaprolactam; polyhexamethylene adipamide and polydecamethylene adipamide; polyurethanes; and epoxy resins.

The synthetic polymer can be in any physical form, including (for example) filaments, yarns, films, sheets, molded articles, latex, and foam.

A sufficient amount of the stabilizer combination is used to improve the resistance of the synthetic polymer to deterioration in physical properties, including, for example, discoloration, reduction in melt viscosity and embrittlement, under the conditions to which the polymer will be subjected. Very small amounts are usually adequate. Amounts within the range from about 0.005 to about 5% total stabilizers by weight of the polymer are satisfactory. Preferably, from 0.05 to 2% is employed for optimum stabilization.

Preferably, the stabilizer system comprises from about 89.5 to about 30% of the 2,2,6,6-tetrasubstituted-4-piperidyl carboxylic acid ester, from about 69.5 to about 10% of the triphosphite, and from about 10 to about 0.5% of the acid phosphite by weight of the stabilizer system.

The stabilizer compositions of the invention can be employed as the sole stabilizers or, preferably, in combination with other conventional heat and light stabilizers for the particular synthetic polymer.

Thus, for example, in the case of polyvinyl chloride resins, other polyvinyl chloride resin heat stabilizers can be included, including polyvalent metal fatty acid salts such as barium and cadmium salts of the higher fatty acids; organotin compounds; hindered phenols; and epoxy compounds.

With polyolefin resins there can be employed fatty acid salts of polyvalent metals, phenolic antioxidants, and the higher fatty acid esters of thiodipropionic acids, such as, for example, dilauryl thiodipropionate.

With polyamide resin compositions, polyamide stabilizers such as copper salts in combination with iodides and/or other phosphorus compounds and salts of divalent manganese can be used.

With synthetic rubbers and acrylonitrile-butadiene-styrene terpolymers, antioxidants such as hindered phenols and bis-phenols and polyvalent metal salts of the higher fatty acids can be used.

In addition, other conventional additives for synthetic polymers, such as plasticizers, lubricants, emulsifiers, antistatic agents, flameproofing agents, pigments and fillers, can be employed.

The following Examples in the opinion of the inventors represent preferred embodiments of synthetic resin compositions in accordance with the invention.

EXAMPLES 1 to 6

A group of polyvinyl chloride resin compositions was prepared having the following formulation:

| Ingredient | Parts by Weight |
|---|---|
| Polyvinyl chloride | 100 |
| Dioctylphthalate | 50 |
| Ca stearate | 1.0 |
| Zn stearate | 0.1 |
| Piperidyl ester as shown in Table I | 0.7 |
| Triphosphite as shown in Table I | 1.2 |
| Acid phosphite as shown in Table I | 0.1 |

This formulation was blended and sheeted off on a two-roll mill to form sheets 1 mm thick. The light resistance of these sheets was then determined by placing strips 1 cm long in a Weather-O-Meter, and exposing them to ultraviolet light. The time in hours was then noted for the sheet to develop a noticeable discoloration and/or embrittlement, indicating deterioration due to oxidation in the presence of ultraviolet light (denoted as Hours to Failure in Table I).

Heat stability was evaluated in a Geer forced air oven at 175° C, and the time to failure in minutes noted (denoted as Minutes to Failure in Table I).

This test was carried out for the stabilizers in accordance with the invention having the formulae indicated in Table I. The following results were obtained:

TABLE I

| Example No. | Piperidyl Compound | Triphosphite | Acid Phosphite | Hours to Failure | Minutes to Failure |
|---|---|---|---|---|---|
| Control 1 | None | None | None | 280 | 45 |
| Control 2 | [phenyl-COO-tetramethylpiperidyl-NH structure] | Tris(nonyl phenyl) phosphite | None | 670 | 75 |
| Control 3 | None | Distearyl pentaerythritol diphosphite | Dibutyl hydrogen phosphite | 310 | 105 |
| Control 4 | [bis(tetramethylpiperidyl-N-O) sebacate structure] | None | Bis(nonyl phenyl) hydrogen phosphite | 630 | 60 |
| 1 | [phenyl-COO-tetramethylpiperidyl-NH structure] | Tris(nonyl phenyl) phosphite | Bis(nonyl phenyl) hydrogen phosphite | 860 | 105 |
| 2 | [t-Bu, HO, t-Bu phenyl-C₂H₄COO-CH₂-spiro structure with NO· tetramethylpiperidyl] | Octyl diphenyl phosphite | Octyl-phenyl-hydrogen phosphite | 840 | 105 |
| 3 | [bis(tetramethylpiperidyl-N-O) sebacate structure] | Tetra(C₁₂₋₁₅alkyl) 4,4′-isopropylidene diphenol diphosphite | Bis(nonylpnenyl) hydrogen phosphite | 910 | 120 |

TABLE I-continued

| Example No. | Piperidyl Compound | Triphosphite | Acid Phosphite | Hours to Failure | Minutes to Failure |
|---|---|---|---|---|---|
| 4 | (structure: tris ester of 2,2,6,6-tetramethyl-4-piperidyl with CH₂—COO—, CH—COO—, CH₃—CH—COO— branches) | Distearylpentaerythritol diphosphite | Dibutyl hydrogen phosphite | 930 | 120 |
| 5 | [N—CH₂COO—(2,2,6,6-tetramethyl-4-piperidyl NH)]₃ | Tetra(tridecyl) 4,4'-butylidene bis (3-methyl-6-t-butyl phenol) diphosphite | Diphenyl hydrogen phosphite Zn salt | 940 | 120 |
| 6 | (1,3,5-benzenetricarboxylate tris ester with 2,2,6,6-tetramethyl-1-oxyl-4-piperidyl groups) | Phenyl-4,4'-isopropylidene diphenol-pentaerythritol diphosphite | Dilauryl hydrogen phosphite Ca salt | 890 | 120 |

It is apparent that the stabilizer compositions in accordance with the invention are far superior to the controls containing no stabilizer or only one or two of the three-component stabilizer of the invention.

EXAMPLES 7 to 12

Polypropylene compositions were prepared using stabilizers of the invention and having the following formulation:

| Ingredient | Parts by Weight |
|---|---|
| Polypropylene | 100 |
| Dilauryl thiodipropionate | 0.3 |
| Irganox 1010 (pentaerythritol (di-tert-butyl-hydroxy phenyl)propionate.) | 0.2 |
| Piperidyl ester as shown in Table II | 0.3 |
| Triphosphite as shown in Table II | 0.1 |
| Acid phosphite as shown in Table II | 0.01 |

The composition was thoroughly blended in a Brabender Plastograph, and then compression-molded to form sheets 0.5 mm thick.

Pieces 2.5 cm square were cut off from the sheets and exposed to ultraviolet light in a Weather-O-Meter.

Heat stability was evaluated in an air circulating oven at 160° C.

In each test, the time in hours required for the sheet to develop a noticeable discoloration and/or embrittlement was noted as the hours to failure.

The results obtained are shown in Table II.

TABLE II

| Ex. No. | Piperidyl Compound | Tri-phosphite | Acid phosphite | Hours to Failure (Weather-O-Meter) | (Oven) |
|---|---|---|---|---|---|
| Control 1 | None | Tris-(mono-di-nonyl phenyl) phosphite | Dilauryl hydrogen phosphite | 270 | 1070 |
| Control 2 | 2-hydroxy-4-octoxy-benzophenone | Bis(octyl phenyl) bis [4,4'-butylidene bis (3-methyl-6-t-butyl phenol)] 1,6-hexane diol di phosphite | Diphenyl hydrogen phosphite | 360 | 990 |
| Control 3 | [structure: bis(2,2,6,6-tetramethylpiperidyl) sebacate-type diester with –OCCC₈H₁₆CO–] | None | None | 520 | 380 |
| Control 4 | [structure: tris(2,2,6,6-tetramethylpiperidyl) triazine-trione with C₂H₄COO linkers] | Bis(nonylphenyl) pentaerythritol diphosphite | None | 550 | 470 |
| 7 | [structure: bis(2,2,6,6-tetramethylpiperidyl) diester with –OCCC₈H₁₆CO–] | Tetra(tridecyl)-4,4'-butylidene-bis (3-methyl-6-t-butyl phenol) di-phosphite | Tri(tridecyl)-4,4'-butylidene-bis (3-methyl-6-t-butylphenol) hydrogen phosphite | 830 | 1240 |
| 8 | [structure: bis(2,2,6,6-tetramethylpiperidyl) spiro-dioxa ring compound with –OOCC₂H₄– and –H₄C₂COO– linkers] | Tris(mono-dinonyl phenyl) phosphite | Dilauryl hydrogen phosphite | 800 | 1160 |

TABLE II-continued

| Ex. No. | Piperidyl Compound | Tri-phosphite | Acid phosphite | Hours to Failure (Weather-O-Meter) | (Oven) |
|---|---|---|---|---|---|
| 9 | 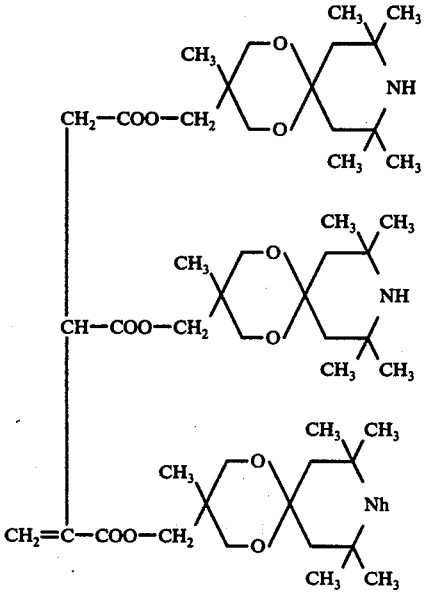 | Bis(octyl-phenyl) bis [4,4'-butyli-dene bis (3,-methyl-6-t-butyl-phenol) 1,6-hexane-diol di-phosphate | Diphenyl hydrogen phosphite | 790 | 1030 |
| 10 | 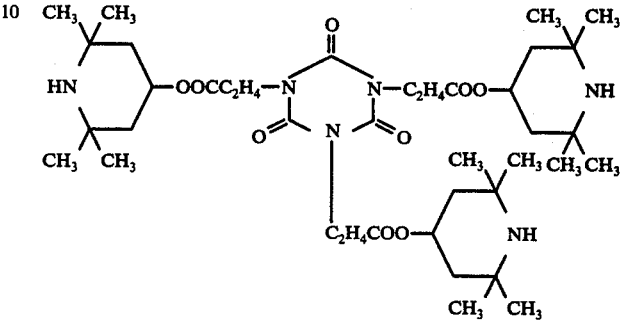 | Bis (nonyl-phenyl)pentae-thritol diphosphiet | Nonylphenyl-pynta-erythritol-hydrogen diphosphite | 850 | 1120 |
| 11 | 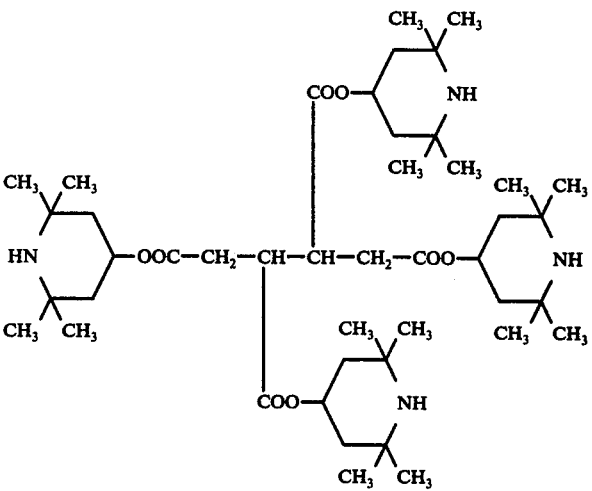 | Bis (nonyl-phenyl)-4,4'-isopro-pylidene bis (2-t-butyl phenol) phosphite | Nonylphenyl-4,4'-isopropylidene bis (2-t-butyl phenol) hydrogen phosphite | 810 | 1070 |

TABLE II-continued

| Ex. No. | Piperidyl Compound | Tri-phosphite | Acid phosphite | Hours to Failure (Weather-O-Meter) | (Oven) |
|---|---|---|---|---|---|
| 12 |  | Octyldiphenyl phosphite | Octyl-phenyl hydrogen phosphite K salt | 830 | 1050 |

It is apparent from the above results that the compounds of the invention are superior stabilizers in enhancing the resistance of the polypropylene polymer composition to deterioration in the presence of ultraviolet light.

EXAMPLES 13 to 18

Ethylene-vinyl acetate copolymer compositions were prepared using stabilizers of the invention and having the following formulation:

| Ingredient | Parts by Weight |
|---|---|
| Ethylene-vinyl acetate copolymer | 100 |
| Montan wax | 0.3 |
| Piperidyl ester as shown in Table III | 0.25 |
| Triphosphite as shown in Table III | 0.25 |
| Acid phosphite as shown in Table III | 0.005 |

The stabilizer was blended with the polymer on a two-roll mill at 120° C, and sheets 1 mm thick were then compression molded at 120° C from the resulting blend. Pieces 2.5 cm square were cut off from the sheets and exposed to ultraviolet light in a Weather-O-Meter for 500 hours. At the start and at the conclusion of the test, the tensile strength of the sheet samples was determined.

Heat stability was evaluated in a Geer forced air oven at 175° C. Initial color was determined using a Hunter color difference meter.

The results are given in Table III as % retention of the initially determined tensile strength, minutes to failure in the oven test, and intial yellowness:

TABLE III

| Ex. No. | Piperidyl Compound | Triphosphite | Acid phosphite | % Retention of tensile strength | Minutes to Color Failure (oven) | Color |
|---|---|---|---|---|---|---|
| Control 1 | None | None | None | 53 | 60 | 32 |
| Control 2 | None | Tris(nonylphenyl) phosphite | Di(nonylphenyl) hydrogen phosphite | 58 | 105 | 10 |
| Control 3 | (structure shown) | None | Diphenyl hydrogen phosphite | 75 | 45 | 22 |
| Control 4 | (structure shown) | Tetra($C_{12-15}$alkyl) 4,4'-isopropylidene diphenol diphosphite | None | 73 | 75 | 19 |
| 13 | (structure shown) | Octyldiphenyl phosphite | Diphenyl hydrogen phosphite | 80 | 105 | 11 |

TABLE III-continued

| Ex. No. | Piperidyl Compound | Triphosphite | Acid phosphite | % Retention of tensile strength | Oven Heating Minutes to Color Failure (oven) | Color |
|---|---|---|---|---|---|---|
| 14 | (structure) | Distearyl pentaerythritol diphosphite | Pentaerythritol dihydrogen diphosphite | 83 | 120 | 8 |
| 15 | (structure) | Tris(nonylphenyl) phosphite | Di(nonylphenyl) hydrogen phosphite | 79 | 120 | 10 |
| 16 | (structure) | Trilauryl phosphite | Dilauryl hydrogen phosphite Ni salt | 82 | 105 | 10 |
| 17 | (structure) | Tetra (C$_{12-15}$alkyl) 4,4'-isopropylidene diphenol diphosphite | Dibutyl hydrogen phosphite Ba salt | 80 | 105 | 11 |

TABLE III-continued
| Ex. No. | Piperidyl Compound | Triphosphite | Acid phosphite | % Retention of tensile strength | Oven Heating Minutes to Color Failure (oven) | Color |
|---|---|---|---|---|---|---|
| 18 | 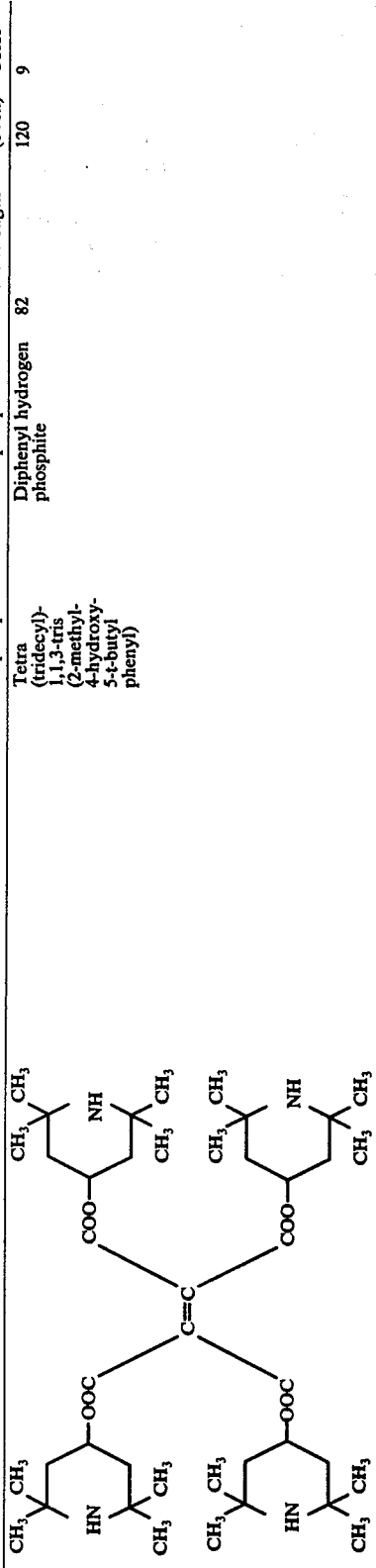 | Tetra (tridecyl)-1,1,3-tris (2-methyl-4-hydroxy-5-t-butyl phenyl) | Diphenyl hydrogen phosphite | 82 | 120 | 9 |

It is apparent from the results that the stabilizer compositions in accordance with the invention are superior in enhancing the resistance of the ethylene-vinyl acetate copolymer to deterioration in the presence of ultraviolet light, and at elevated temperature.

EXAMPLES 19 to 24

High density polyethylene compositions were prepared using five stabilizers of the invention and two of the prior art, and having the following formulation:

| Ingredient | Parts by Weight |
| --- | --- |
| High-density polyethylene | 100 |
| Calcium stearate | 1.0 |

-continued

| Ingredient | Parts by Weight |
| --- | --- |
| Butylated hydroxy toluene | 0.1 |
| Distearyl thiodipropionate | 0.2 |
| Piperidyl ester as shown in Table IV | 0.25 |
| Triphosphite as shown in Table IV | 0.12 |
| Acid phosphite as shown in Table IV | 0.01 |

The stabilizer was blended with the polymer on a two-roll mill and sheets 0.5 mm thick were prepared by compression molding of the blend. Pieces 2.5 cm square were cut off from the sheets, and exposed in a Weather-O-Meter to ultraviolet light.

Heat stability was evaluated in a Geer oven at 150° C.

In each case the time in hours when degradation set in, as determined by a significant discoloration and/or embrittlement, was noted as hours to failure, and the results are reported in Table VI:

TABLE IV
| Ex. No. | Piperidyl Compound | Triphosphite | Acid phosphite | Hours to Failure (Weather-O-Meter) | (Oven) |
|---|---|---|---|---|---|
| Control 1 | None | None | None | 460 | 283 |
| Control 2 | None | Distearyl pentaerythritol diphosphite | Stearyl pentaerythritol hydrogen phosphite | 480 | 662 |
| Control 3 | 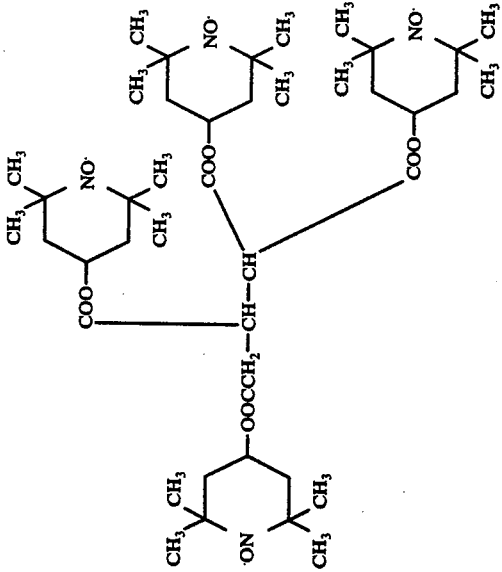 | None | None | 1050 | 214 |
| Control 4 | 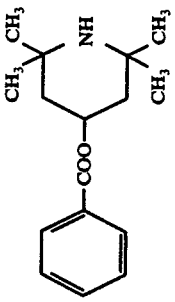 | Phenyl diisodecyl phosphite (0.01) | Diisodecyl hydrogen phosphite (0.12) | 630 | 286 |

TABLE IV-continued
| Ex. No. | Piperidyl Compound | Triphosphite | Acid phosphite | Hours to Failure (Weather-O-Meter) | (Oven) |
|---|---|---|---|---|---|
| Control 5 | 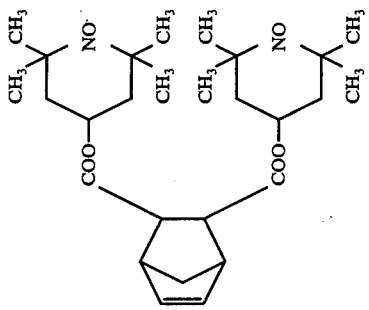 | Tris (nonylphenyl) phosphite | None | 970 | 345 |
| 19 | 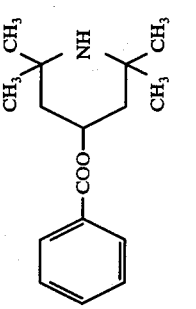 | Phenyl diisodecyl phosphite | Diisodecyl hydrogen phosphite | 950 | 584 |
| Control 20 | 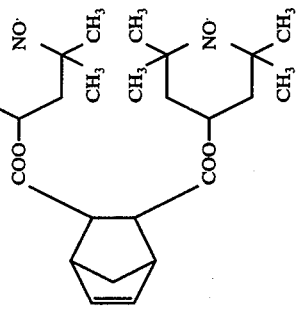 | Tris (nonylphenyl) phosphite | Dibutyl hydrogen phosphite Zn salt | 1080 | 590 |

TABLE IV-continued

| Ex. No. | Piperidyl Compound | Triphosphite | Acid phosphite | Hours to Failure (Weather-O-Meter) | (Oven) |
|---|---|---|---|---|---|
| 21 | [structure] | Hexa(tridecyl)-1,1,3-tris(2-methyl-4-hydroxy-5-t-butyl-phenyl)butanetri-phosphite | Diphenyl hydrogen phosphite Na salt | 1150 | 628 |
| 22 | [structure] | Bis(nonylphenyl)-4,4'-isopropylidene bis(2-t-butylphenyl) phosphite | Di(nonylphenyl) hydrogen phosphite | 1030 | 604 |
| 23 | [structure] | Distearyl penta-erythritol di-phosphite | Stearyl pentaerythritol hydrogenphosphite | 1130 | 651 |

TABLE IV-continued
| Ex. No. | Piperidyl Compound | Triphosphite | Acid phosphite | Hours to Failure (Weather-O-Meter) | (Oven) |
|---|---|---|---|---|---|
| 24 | 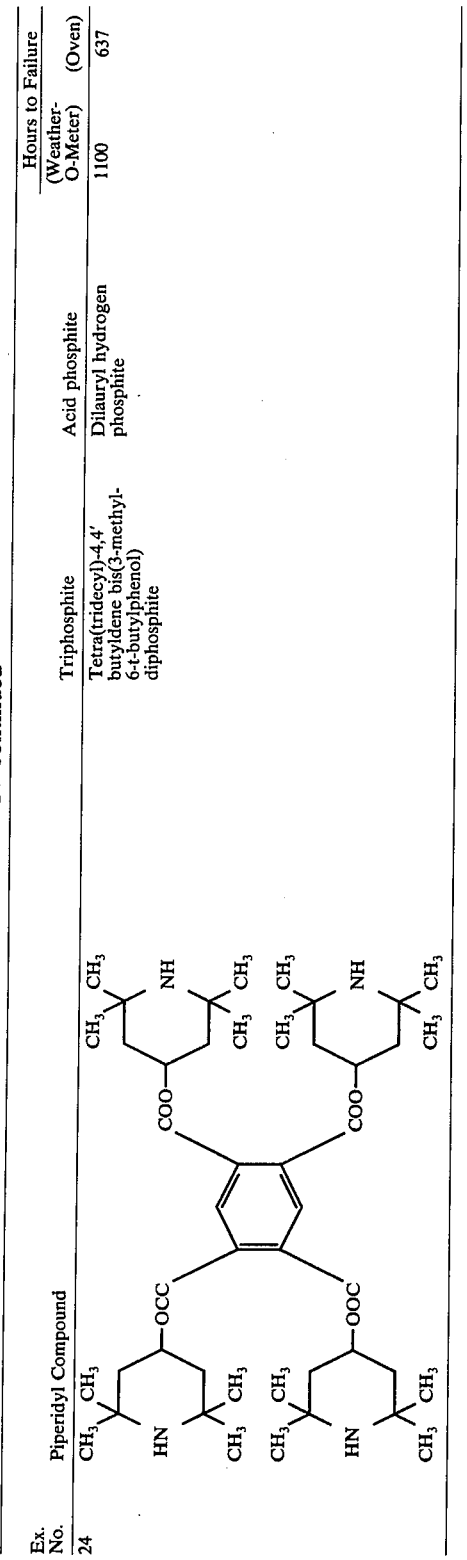 | Tetra(tridecyl)-4,4'-butylidene bis(3-methyl-6-t-butylphenol) diphosphite | Dilauryl hydrogen phosphite | 1100 | 637 |

TABLE V-continued

| Example No. | Piperidyl Compound | Triphosphite | Acid phosphite | %Retention of tensile strength | Color of sheet after heating |
|---|---|---|---|---|---|
| 25 | [structure: bis(2,2,6,6-tetramethylpiperidyl) ester with –OOC-C₈H₁₆-COO– linker] | Octyldiphenyl phosphite | Diphenyl hydrogen phosphite Zn salt | 82 | 2 |
| 26 | [structure: tris(2,2,6,6-tetramethylpiperidyl) ester of tricarboxylic acid, CH₃–CH–COO– branch] | Tris (nonylphenyl) phosphite | Di(nonylphenyl) hydrogen phosphite Mg salt | 81 | 3 |
| 27 | [structure: N[–CH₂COO–CH₂–(pentaerythritol spiro diphosphite with C₂H₅ and 2,2,6,6-tetramethylpiperidyl-NO· )]₃] | Distearyl pentaerythritol diphosphite | Dibutyl hydrogen phosphite | 78 | 3 |
| 28 | [structure: tetra(2,2,6,6-tetramethylpiperidyl) ester, –OOC–CH₂–CH–CH–CH₂–COO– with two COO– branches] | Tris (butoxyethyl) phosphite | Dilauryl hydrogen phosphite Li salt | 80 | 3 |

The stabilizers of the invention are clearly superior to the controls in enhancing resistance of the polyethylene to degradation under ultraviolet light and at elevated temperature.

EXAMPLES 25 to 30

Acrylonitrile-butadiene-styrene terpolymer resin compositions were prepared using stabilizers of the invention and having the following formulation:

| Ingredient | Parts by Weight |
|---|---|
| Acrylonitrile-butadiene-styrene terpolymer | 100 |
| Zinc stearate | 0.5 |
| Piperidyl ester as shown in Table V | 0.60 |
| Triphosphite as shown in Table V | 0.20 |
| Acid phosphite as shown in Table V | 0.05 |

The stabilizer was blended with the resin on a two roll mill, and sheets 2.5 mm thick were prepared by compression molding of the resulting blend. Pieces 2.5 cm square were cut off from the sheets, and subjected to ultraviolet light in a Weather-O-Meter for 800 hours. Tensile strength before and after the test exposure was determined, and the results reported as the percent of tensile strength retained, at the end of this time, in Table V.

Heat stability was evaluated by heating at 210° C under a stress of 50 kg/cm² for ten minutes, and then noting color on a scale from 1 to 10 in which 10 is brown and 1 is white. Color is reported in Table V.

TABLE V

| Example No. | Piperidyl Compound | Triphosphite | Acid phosphite | %Retention of tensile strength | Color of sheet after heating |
|---|---|---|---|---|---|
| Control 1 | None | None | None | 41 | 9 |
| Control 2 | [structure shown] | None | Dibutyl hydrogen phosphite | 49 | 8 |
| Control 3 | [structure shown] | Tetra (C₁₂₋₁₅alkyl) 4,4'-isopropylidene diphenol diphosphite | None | 72 | 6 |
| Control 4 | [structure shown] | Tris (butoxyethyl-phosphite) (0.17) | Dilauryl hydrogen phosphite Li salt (0.34) | 53 | 6 |
| Control 5 | None | Tris (nonylphenyl) phosphite | di (nonylphenyl) hydrogen phosphite Mg salt | 44 | 4 |

TABLE V-continued

| Example No. | Piperidyl Compound | Triphosphite | Acid phosphite | %Retention of tensile strength | Color of sheet after heating |
|---|---|---|---|---|---|
| 29 | [structure with four 2,2,6,6-tetramethylpiperidyl groups connected via -OOC- linkages to a CHCH$_2$CH central unit, with HN groups] | Tetra (C$_{12-15}$alkyl) 4,4'-isopropylidene diphenol diphosphite | Tris (C$_{12-15}$alkyl) 4,4'-isopropylidene diphenol hydrogen diphosphite | 84 | 2 |
| 30 | [structure with four 2,2,6,6-tetramethylpiperidyl N-oxyl groups connected via -OOC- linkages to a bicyclic alkene central unit] | Phenyl 4,4'-isopropylidene diphenol pentaerythritol diphosphite | 4,4'-isopropylidene diphenol pentaerythritol hydrogen phosphite | 85 | 3 |

It is apparent from the data that the stabilizers of the invention are superior to the controls.

EXAMPLES 31 to 36

Polyamide resin compositions were prepared using stabilizers of the invention and having the following formulation:

| Ingredient | Parts by Weight |
|---|---|
| Poly-epsilon-caprolactam | 100 |
| Piperidyl ester as shown in Table VI | 0.25 |
| Triphosphite as shown in Table VI | 0.05 |
| Acid phosphite as shown in Table VI | 0.01 |

The stabilizer was blended with the finely powdered poly-epsiloncaprolactam in a ball mill for fifteen minutes, and the resulting powder was then compression-molded at 250° C to form sheets 0.5 mm thick. Pieces 2.5 cm square were cut out from the sheets, and exposed to ultraviolet light in a Weather-O-Meter for 120 hours. At the conclusion of the test period, the color of the sheets was noted. The color was also noted after heating at 225° C for 30 minutes in a Geer oven.

TABLE VI

| Example No. | Piperidyl Compound | Triphosphite | Acid phosphite | Color of sheet after irradiation | Color of sheet after heating |
|---|---|---|---|---|---|
| Control 1 | None | None | None | Brown | Brown |
| Control 2 | None | | Bis (nonylphenyl) 4,4'-isopropylidene diphenol phosphite | Bis (nonylphenyl) hydrogen phosphite Sr salt | Brown | Yellow |

TABLE VI-continued

| Example No. | Piperidyl Compound | Triphosphite | Acid phosphite | Color of sheet after irradiation | Color of sheet after heating |
|---|---|---|---|---|---|
| Control 3 | (structure: bis/tris piperidyl ester compound with central CH-CH backbone, four 2,2,6,6-tetramethyl-4-piperidyl NH groups linked via COO/OOC) | None | None | Yellow | Brown |
| Control 4 | (benzoate ester of 2,2,6,6-tetramethyl-4-piperidinol, NH) | Tris (nonylphenyl) phosphite | None | Yellow | Yellow |
| Control 5 | (norbornene dicarboxylic acid bis-ester with 2,2,6,6-tetramethyl-4-piperidinyl NO· groups) | None | Pentaerythritol phosphite | Yellow | Light Yellow |
| 31 | (benzoate ester of 2,2,6,6-tetramethyl-4-piperidinol, NH) | Tris (nonylphenyl) phosphite | Diphenyl hydrogen phosphite | Light yellow | Light yellow |
| 32 | (bis(2,2,6,6-tetramethyl-4-piperidyl) sebacate: HN-piperidyl-O-OC-C$_8$H$_{16}$-CO-O-piperidyl-NH) | Distearyl pentaerythritol diphosphite | Stearyl pentaerythritol hydrogen phosphite | Very light yellow | Light yellow |

TABLE VI-continued

| Example No. | Piperidyl Compound | Triphosphite | Acid phosphite | Color of sheet after irradiation | Color of sheet after heating |
|---|---|---|---|---|---|
| 33 | 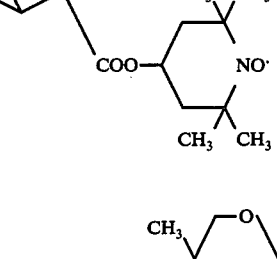 | Di(nonyl-phenyl) pentaery-thritol diphosphite | Pentaery-thritol dihydrogen diphosphite | Very light yellow | Light yellow |
| 34 | 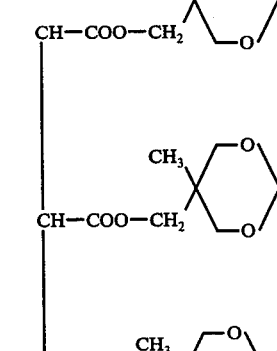 | Bis(nonyl-phenyl) 4,4'-iso-propylidene phenol phosphite | Bis(nonyl-phenyl) hydrogen phosphite Sr salt | Light yellow | Light yellow |
| 35 | 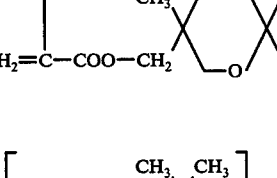 | Tetra (tridecyl) 1,1,3-tris (2-methyl-4-hydroxy-5-t-butyl-phenyl) butane diphosphite | Dibutyl hydrogen phosphite | Light yellow | Very light yellow |
| 36 | 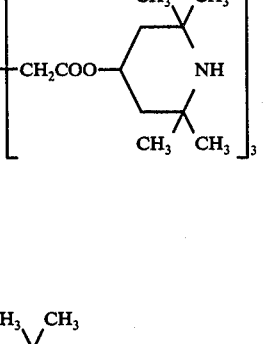 | Tetra ($C_{12-15}$alkyl) 4,4'-iso-propylidene diphenol diphosphite | Tris ($C_{12-15}$alkyl) 4,4'-iso-propylidene diphenol hydrogen phosphite | Very light yellow | Very light yellow |

It is apparent that the stabilizers of the invention are effective ultraviolet light and heat stabilizers for polyamide resins.

EXAMPLES 37 to 42

Polybutylene terephthalate resin compositions were prepared having the following compositions:

| Ingredient | Parts by Weight |
|---|---|
| Polybutylene terephthalate | 100 |
| 4,4'-butylidene bis(3-methyl-6-t-butylphenol) | 0.1 |
| Piperidyl ester as shown in Table VII | 0.42 |
| Triphosphite as shown in Table VII | 0.50 |
| Acid phosphite as shown in Table VII | 0.08 |

The compositions were extruded to form pellets, and then test pieces were molded from the pellets by injection molding at 270° C. Test pieces were irradiated with ultraviolet light for 500 hours in a Weather-O-Meter. Other test pieces were heated in an air oven at 150° C for 240 hours to determine heat stability. Tensile strength before and after the test was determined, and the percent tensile strength retained in each test is given in Table VII:

TABLE VII

| Ex. No. | Piperydyl Compound | Triphosphite | Acid phosphite | % Retention of Tensile Strength (Irradiation) | (heating) |
|---|---|---|---|---|---|
| Control 1 | None | None | None | 46 | 62 |
| Control 2 | None | Tetra (tridecyl 4,4'-butylidene bis(3-methyl-6-t-butyl phenol diphosphite | Tris (tridecyl 4,4'-butylidene bis(3-methyl-6-t-butyl phenol) hydrogen diphosphite Zn salt | 52 | 78 |
| Control 3 | (structure shown) | Distearyl pentaerythritol diphosphite | None | 74 | 71 |
| Control 4 | (structure shown) | Trilauryl phosphite (0.80) | Dilauryl hydrogen phosphite (0.05) | 58 | 75 |
| Control 5 | 2-hydroxy-4-octoxybenzophenone | Tris(nonylphenyl) phosphite | Bis (nonylphenyl) hydrogen phosphite Ca salt | 63 | 79 |
| 37 | (structure shown) | Distearyl pentaerythritol diphosphite | Stearyl pentaerythritol hydrogen diphosphite | 88 | 85 |
| 38 | (structure shown) | Phenyl diisodecyl phosphite | Diisodecyl hydrogen phosphite | 82 | 81 |

TABLE VII-continued

| Ex. No. | Piperydyl Compound | Triphosphite | Acid phosphite | % Retention of Tensile Strength | |
|---|---|---|---|---|---|
| | | | | (Irradiation) | (heating) |
| 39 | [structure] | Tris (nonylphenyl) phosphite | Bis (nonylphenyl) hydrogen phosphite Ca salt | 85 | 80 |
| 40 | [structure] | Tetra (C$_{12-15}$alkyl) 4,4'-isopropylidene diphenol diphosphite | Diphenyl hydrogen phosphite | 80 | 83 |
| 41 | [structure] | Tetra (tridecyl) 4,4'-butylidene bis (3-methyl-6-t-butylphenol) diphosphite | Tris (tridecyl) 4,4'-butylidene bis (3-methyl-6-t-butylphenol) hydrogen di-phosphite Zn salt | 87 | 81 |
| 42 | [structure] | Trilauryl phosphite | Dilauryl hydrogen phosphite | 82 | 77 |

It is apparent that the stabilizers of the invention are effective ultraviolet light and heat stabilizers for polyester resins.

Having regard to the following disclosure, the following is claimed as inventive and patentable embodiments thereof:

1. A stabilizer composition for organic polymeric materials comprising an amount with the range from about 69.5 to about 10% of a triphosphite, an amount within the range from about 10 to about 0.5% of an acid phosphite, the acid phosphite being selected from the group consisting of acid phosphites, acid phosphite metal salts and acid phosphite ammonium salts, and an amount within the range from about 89.5 to about 30% of a 2,2,6,6-tetramethyl-4-piperidyl carboxylic acid ester having the general formula:

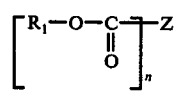

wherein:

R₁ is selected from the group consisting of

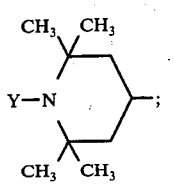; 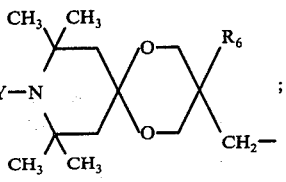;

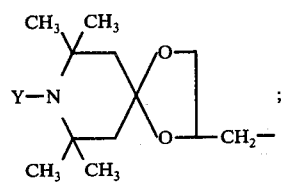; 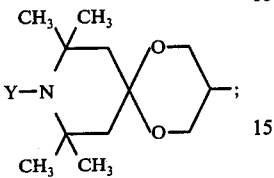;

Y is selected from the group consisting of hydrogen and O;
R₆ is lower alkyl having from one to six carbon atoms;
n is selected from the group consisting of 1, 2, 3 and 4; and
Z is an organic radical having a valence from 1 to 4, the valence positions being taken by

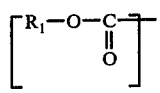

groups, and from one to about twenty carbon atoms, and selected from the group consisting of alkyl, alkenyl, alkylene, alkenylene, alkylidene; aryl, arylene, aralkyl, aralkylene, aralkylidene, alkaryl, alkarylene, alkarylidene; heterocycloalkyl, heterocycloalkylene, heterocycloalkylidene; cycloalkyl, cycloalkenyl, cycloalkylene, cycloalkenylene, cycloalkylidene, alkcycloalkyl, alkcycloalkenyl, alkcycloalkenylene, alkcycloalkylene, cycloalkylene, cycloalkalkyl, cycloalkalkenyl, and cycloalkalkenylene, and amino- and hydroxy-substituted such radicals.

2. A stabilizer composition according to claim 1 in which n is one.
3. A stabilizer composition according to claim 1 in which n is two.
4. A stabilizer composition according to claim 1 in which n is three.
5. A stabilizer composition according to claim 1 in which n is four.
6. A stabilizer composition according to claim 1 in which Z is alkyl.
7. A stabilizer composition according to claim 1 in which Z is alkylene.
8. A stabilizer composition according to claim 1 in which Z is aminoalkylene.
9. A stabilizer composition according to claim 1 in which Z is isocyanurate.
10. A stabilizer composition according to claim 1 in which Z is arylene.
11. A stabilizer composition according to claim 1 in which Z is cycloalkylene.
12. A stabilizer composition according to claim 1 in which R₁ is

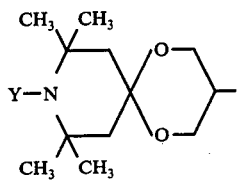

13. A stabilizer composition according to claim 1 in which R₁ is

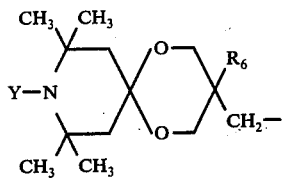

14. A stabilizer composition according to claim 1 in which R₁ is

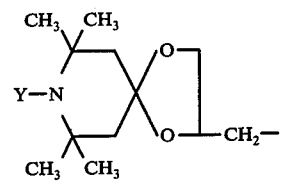

15. A stabilizer composition according to claim 1 in which R₁ is

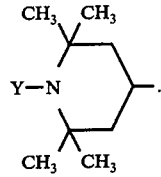

16. A stabilizer composition according to claim 1 in which the organic triphosphite has the formula:

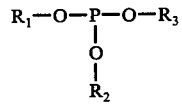

in which R₁, R₂ and R₃ are selected from the group consisting of alkyl, alkenyl, aryl, alkaryl, aralkyl, and cycloalkyl groups having from one to about thirty carbon atoms.

17. A stabilizer composition according to claim 1 in which the acid phosphite has the formula:

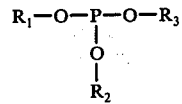

in which R₁, R₂ and R₃ are selected from the group consisting of hydrogen, a cation of a metal, ammonium, alkyl, alkenyl, aryl, alkaryl, aralkyl and cycloalkyl groups having from one to about thirty carbon atoms, and at least one of $R_1$, $R_2$ and $R_3$ is hydrogen, a cation or ammonium.

18. A stabilizer composition according to claim 1 in which the triphosphite is a tetraoxadiphosphaspiro undecane of the formula:

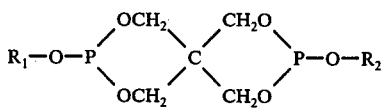

in which $R_1$ and $R_2$ are selected from the group consisting of alkyl, aryl, aryloxyethyl, alkoxyethyl, aryloxyethoxyethyl, alkoxyethoxyethyl and alkoxypolyethoxyethyl radicals having from one to about 30 carbon atoms.

19. A stabilizer composition according to claim 1 in which the triphosphite has one of the formulae:

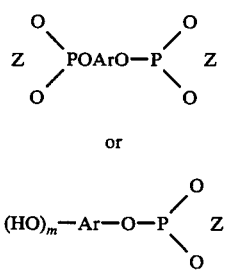

in which Ar is a mono or bicyclic aromatic nucleus, m is an integer of from 0 to about 5; and Z is from one to two organic radicals selected from the group consisting of alkyl, alkenyl, aryl, alkaryl, aralkyl, and cycloalkyl groups having from one to about thirty carbon atoms, and alkylene, arylene, aralkylene, alkarylene and cycloalkylene radicals having from two to about thirty carbon atoms.

20. A stabilizer composition according to claim 1 in which the acid phosphite is a salt of a cation selected from the group consisting of alkali metals, alkaline earth metals, ammonium, magnesium, tin and zinc.

21. A polyvinyl chloride resin composition having improved resistance to deterioration when heated at 350° F, comprising a polyvinyl chloride resin formed at least in part of the recurring group

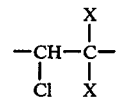

and having a chlorine content in excess of 40%, where X is either hydrogen or chlorine; and an amount to improve resistance to deterioration of the resin of a stabilizer composition in accordance with claim 1.

22. A polyvinyl chloride resin composition in accordance with claim 21, in which the polyvinyl chloride resin is polyvinyl chloride homopolymer.

23. A polyvinyl chloride resin composition in accordance with claim 21, in which the polyvinyl chloride resin is a copolymer of vinyl chloride and vinyl acetate.

24. An olefin polymer composition having improved resistance to deterioration comprising an olefin polymer selected from the group consisting of polymers of alpha-olefins having from two to six carbon atoms and polystyrene, and an amount to improve resistance to deterioration of the polymer of a stabilizer composition in accordance with claim 1.

25. An olefin polymer composition in accordance with claim 24, wherein the polyolefin is polypropylene.

26. An olefin polymer composition in accordance with claim 24, wherein the polyolefin is polyethylene.

27. An acrylonitrile-butadiene-styrene polymer having improved resistance to deterioration when heated at 300° F and above comprising an acrylonitrille-butadiene-styrene polymer and an amount to enhance the resistance to deterioration of the polymer of a stabilizer composition in accordance with claim 1.

28. A polyester resin composition having improved resistance to deterioration comprising a polyester resin and an amount to enhance the resistance to deterioration of the resin of a stabilizer composition in accordance with claim 1.

29. A polyamide resin composition having improved resistance to deterioration comprising a polyamide resin and an amount to enhance the resistance to deterioration of the resin of a stabilizer composition in accordance with claim 1.

30. An ethylene-vinyl acetate copolymer composition having improved resistance to deterioration comprising an ethylene-vinyl acetate copolymer and an amount to enhance the resistance to deterioration of the copolymer of a stabilizer composition in accordance with claim 1.

* * * * *

UNITED STATES PATENT AND TRADEMARK OFFICE
CERTIFICATE OF CORRECTION

PATENT NO. : 4,110,306

DATED : August 29, 1978

INVENTOR(S) : Motonobu Minagawa et al

It is certified that error appears in the above-identified patent and that said Letters Patent are hereby corrected as shown below:

| | |
|---|---|
| Abstract [57] | "O;" should be --O˙;-- |
| Column 1, line 26 | "Formula" should be --formula-- |
| Column 2, line 19 | "oyxgen" should be --oxygen-- |
| Column 5, line 30 | "Nov. 8" should be --Nov. 18-- |
| Column 5, line 67 | "dehydropyrindinyl" should be --dehydropyridinyl-- |
| Column 6, line 28 | "R¹" should be --$R_1$-- |
| Column 7, line 27 | "substititd" should be --substituent-- |
| Column 7, line 36 | "substituted" should be --substituent-- |
| Column 7, line 49 | "and" should be --an-- |
| Column 8, line 11 | "O;" should be O˙;-- |
| Column 8, line 41 | "hexacecyl" should be --hexadecyl-- |
| Column 8, line 51 | "napthyl" should be --naphthyl-- |
| Column 8, line 55 | "napthethyl" should be --naphthethyl-- |
| Column 8, line 66 | "cyclolkenyl" should be --cycloalkenyl-- |

UNITED STATES PATENT AND TRADEMARK OFFICE
CERTIFICATE OF CORRECTION

PATENT NO. : 4,110,306

DATED : August 29, 1978

INVENTOR(S) : Motonobu Minagawa et al

It is certified that error appears in the above-identified patent and that said Letters Patent are hereby corrected as shown below:

Columns 15-16, Formula 18 :

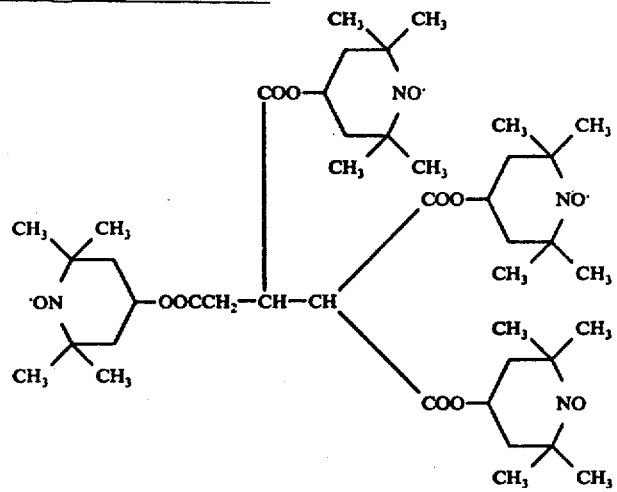

should be

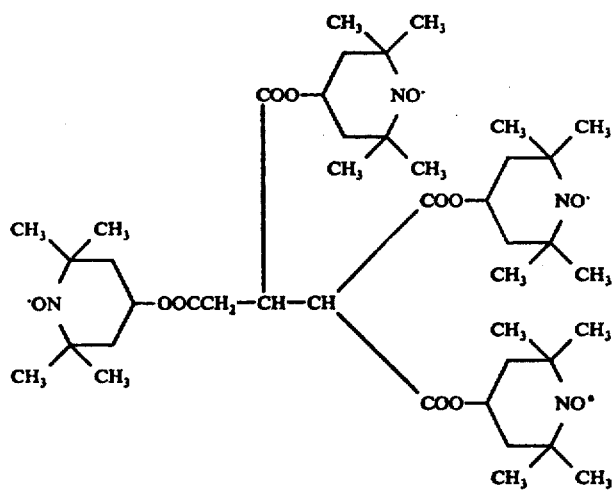

UNITED STATES PATENT AND TRADEMARK OFFICE
CERTIFICATE OF CORRECTION

PATENT NO. : 4,110,306
DATED : August 29, 1978
INVENTOR(S) : Motonobu Minagawa et al It is certified that error appears in the above-identified patent and that said Letters Patent are hereby corrected as shown below:

Column 17, line 40 : "corresponsing" should be --corresponding--

Column 17, line 55 :

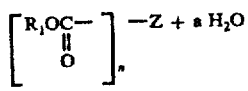

should be

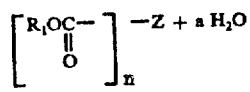

Column 17, line 60 : "cylopentane" should be --cyclopentane--
Column 18, line 45 : "tiphosphites" should be --triphosphites--
Column 19, line 1 : after "is" please insert --a--
Column 19, line 4 : "30" should be --thirty--
Column 19, line 40 : "phospites" should be --phosphites--
Column 19, line 42 : "espcially" should be --especially--

UNITED STATES PATENT AND TRADEMARK OFFICE
CERTIFICATE OF CORRECTION

PATENT NO. : 4,110,306  
DATED : August 29, 1978  
INVENTOR(S) : Motonobu Minagawa et al Page 4 of 20

It is certified that error appears in the above-identified patent and that said Letters Patent are hereby corrected as shown below:

Column 19, lines 50 and 55:

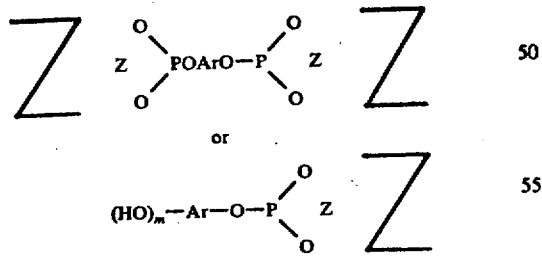

should be

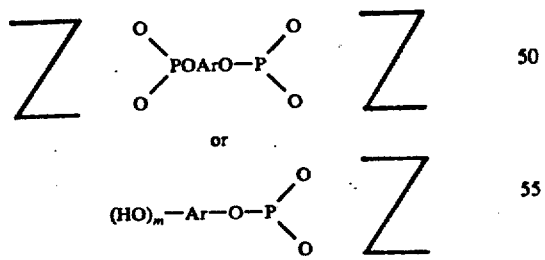

| | |
|---|---|
| Column 20, line 7 | : "phospite" should be --phosphite-- |
| Column 20, line 12 | : "phoshite" should be --phosphite-- |
| Column 20, line 24 | : "2octoxy" should be -- 2-octoxy-- |
| Column 20, line 25 | : "5,5diethyl" should be --5,5-diethyl-- |
| Column 20, line 36 | : "(5,5undecane," should be --(5,5-undecane, -- |
| Column 20, line 46 | : "3,9diphosphaspiro" should be --3,9-diphosphaspiro-- |

UNITED STATES PATENT AND TRADEMARK OFFICE
CERTIFICATE OF CORRECTION

PATENT NO. : 4,110,306

DATED : August 29, 1978

INVENTOR(S) : Motonobu Minagawa et al

It is certified that error appears in the above-identified patent and that said Letters Patent are hereby corrected as shown below:

| | | |
|---|---|---|
| Column 20, line 55 | : | "3,9di" should be --3,9-di-- |
| Column 20, line 61 | : | "5methyl" should be --5-methyl-- |
| Column 20, line 63 | : | "butylidenebis" should be --butylidene-bis-- |
| Column 21, line 4 | : | "5methyl" should be --5-methyl-- |
| Column 21, line 7 | : | "penyl" should be --phenyl-- |
| Column 21, line 41 | : | "amono" should be --mono-- |
| Column 21, line 54 | : | "triiooctyl" should be --triisooctyl-- |
| Column 21, line 59 | : | Please delete "6,1'" second occurrence |
| Column 21, line 63 | : | "(2°-" should be --(2'- -- |
| Column 22, line 12 | : | "acrylonitrilestyrene" should be --acrylonitrile-styrene-- |

UNITED STATES PATENT AND TRADEMARK OFFICE
CERTIFICATE OF CORRECTION

PATENT NO. : 4,110,306
DATED : August 29, 1978
INVENTOR(S) : Motonobu Minagawa et al Page 6 of 20

It is certified that error appears in the above-identified patent and that said Letters Patent are hereby corrected as shown below:

Column 29, Example No. 9 :

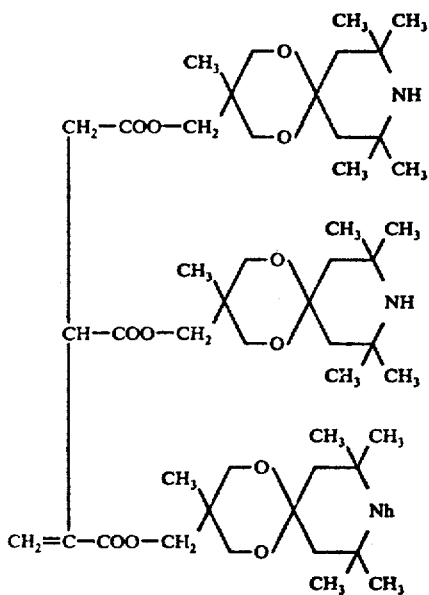 should be 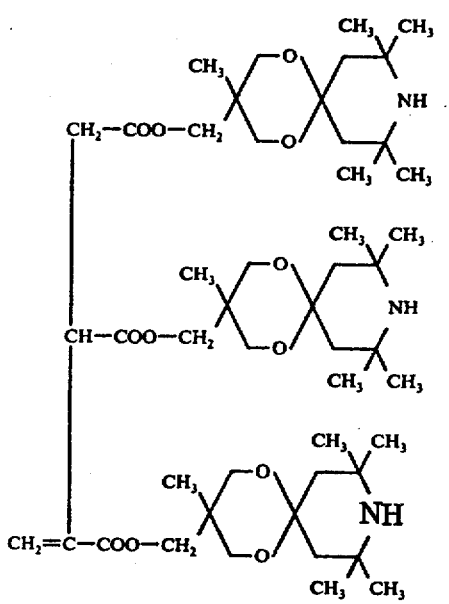

UNITED STATES PATENT AND TRADEMARK OFFICE
CERTIFICATE OF CORRECTION

PATENT NO. : 4,110,306

DATED : August 29, 1978

INVENTOR(S) : Motonobu Minagawa et al

It is certified that error appears in the above-identified patent and that said Letters Patent are hereby corrected as shown below:

Column 30, Example 10 :

Table II

Bis (nonyl-phenyl)pentaerythritol diphosphiet    Nonylphenyl-pentaerythritol-hydrogen diphosphite should be Bis(nonyl-phenyl) penta-erythritol diphosphite    Nonylphenyl-penta-erythritol-hydrogen diphosphite

UNITED STATES PATENT AND TRADEMARK OFFICE
CERTIFICATE OF CORRECTION

PATENT NO. : 4,110,306  Page 8 of 20

DATED : August 29, 1978

INVENTOR(S) : Motonobu Minagawa et al

It is certified that error appears in the above-identified patent and that said Letters Patent are hereby corrected as shown below:

Column 31, Example 12
 Table II :

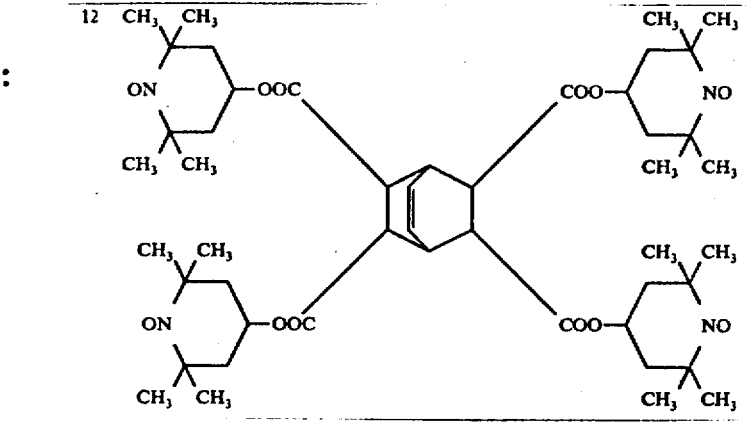

should be

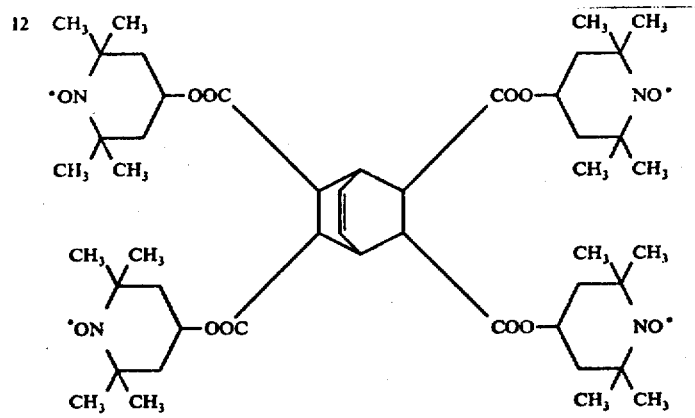

UNITED STATES PATENT AND TRADEMARK OFFICE
CERTIFICATE OF CORRECTION

PATENT NO. : 4,110,306

DATED : August 29, 1978

INVENTOR(S) : Motonobu Minagawa et al

It is certified that error appears in the above-identified patent and that said Letters Patent are hereby corrected as shown below:

<u>Column 32, Example 12</u>
<u>Table II</u>  :

32

| Tri-phosphite | Acid phosphite |
|---|---|
| Octyldiphenyl phosphite | Octyl-phenyl hydrogen phosphite K salt | should be

| Tri-phosphite | Acid phosphite |
|---|---|
| Octyldiphenyl phosphite | Octyl-phenyl hydrogen phosphite K salt |

UNITED STATES PATENT AND TRADEMARK OFFICE
CERTIFICATE OF CORRECTION

PATENT NO. : 4,110,306

DATED : August 29, 1978

INVENTOR(S) : Motonobu Minagawa et al

It is certified that error appears in the above-identified patent and that said Letters Patent are hereby corrected as shown below:

Column 40, line 18 : "Table VI" should be --Table IV--

Column 43,
Control 5 :

Ex.
No.   Piperidyl Compound

Control 5

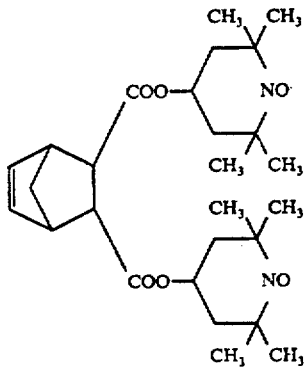

should be

Ex.
No.   Piperidyl Compound

Control 5

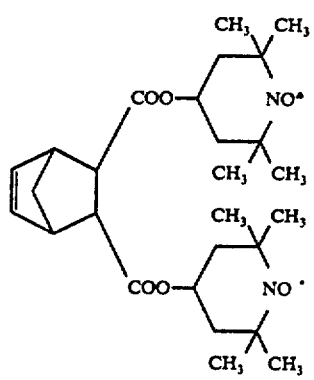

UNITED STATES PATENT AND TRADEMARK OFFICE
CERTIFICATE OF CORRECTION

PATENT NO. : 4,110,306
DATED : August 29, 1978
INVENTOR(S) : Motonobu Minagawa et al It is certified that error appears in the above-identified patent and that said Letters Patent are hereby corrected as shown below:

Column 44, Under Example No. :

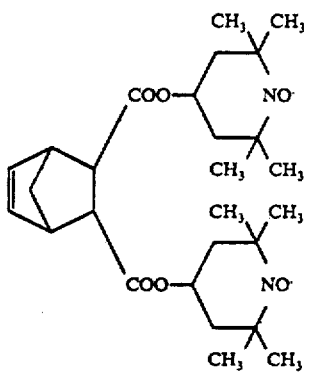 should be 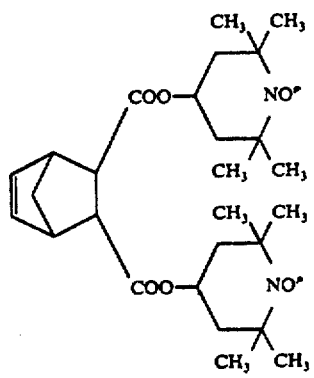

Column 45, Under heading Acid phosphite : "hydrogenphosphite" should be --hydrogen phosphite--

UNITED STATES PATENT AND TRADEMARK OFFICE
CERTIFICATE OF CORRECTION

PATENT NO. : 4,110,306

DATED : August 29, 1978

INVENTOR(S) : Motonobu Minagawa et al

Page 12 of 20

It is certified that error appears in the above-identified patent and that said Letters Patent are hereby corrected as shown below:

Column 51, Under Example No. 26 :

Example No.

26

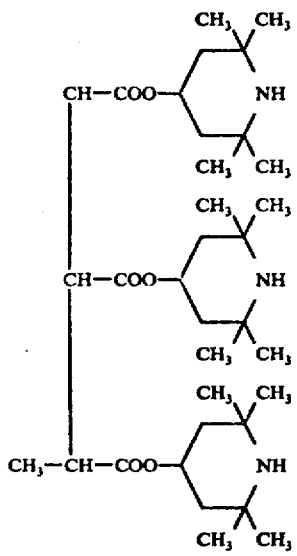

should be

Example No.

26

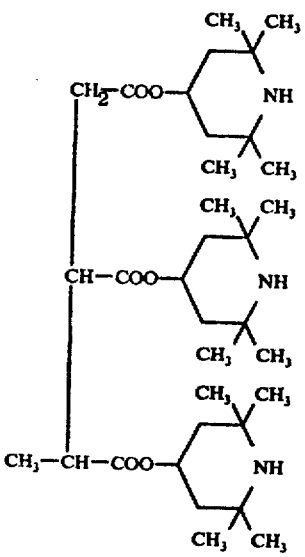

UNITED STATES PATENT AND TRADEMARK OFFICE
CERTIFICATE OF CORRECTION

PATENT NO. : 4,110,306

DATED : August 29, 1978

INVENTOR(S) : Motonobu Minagawa et al

It is certified that error appears in the above-identified patent and that said Letters Patent are hereby corrected as shown below:

Column 55, Example No.
Control 3                  :

Example No.

Control 3

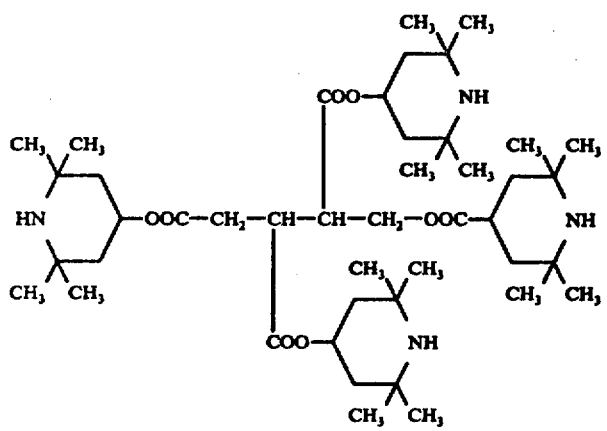

UNITED STATES PATENT AND TRADEMARK OFFICE
CERTIFICATE OF CORRECTION

PATENT NO. : 4,110,306

DATED : August 29, 1978

INVENTOR(S) : Motonobu Minagawa et al

It is certified that error appears in the above-identified patent and that said Letters Patent are hereby corrected as shown below:

Column 55, Example No.
Control 3 :

should be

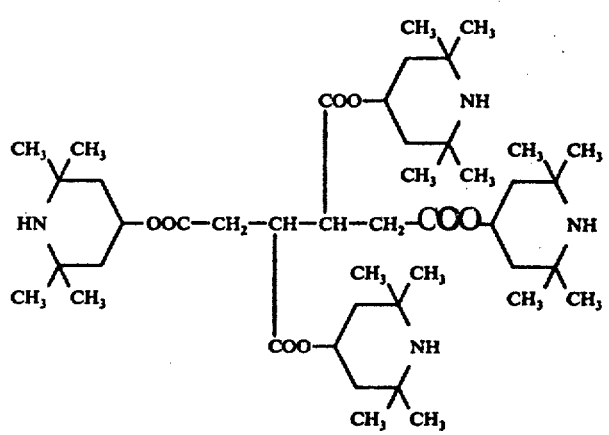

UNITED STATES PATENT AND TRADEMARK OFFICE
CERTIFICATE OF CORRECTION

PATENT NO. : 4,110,306
DATED : August 29, 1978
INVENTOR(S) : Motonobu Minagawa et al It is certified that error appears in the above–identified patent and that said Letters Patent are hereby corrected as shown below:

Column 56, Control 5
heading Acid phosphite    :   "phosphite" should be --diphosphite--

Column 57, Example No. 34 :

Example No. 34

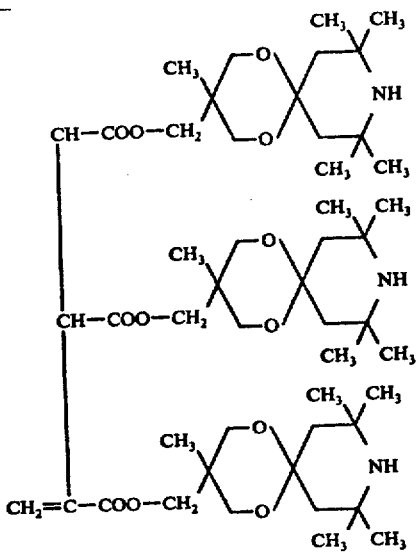

should be

Example No. 34

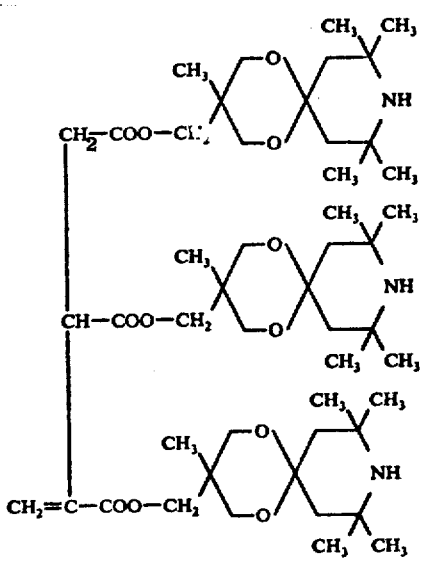

UNITED STATES PATENT AND TRADEMARK OFFICE
CERTIFICATE OF CORRECTION

PATENT NO. : 4,110,306

DATED : August 29, 1978

INVENTOR(S) : Motonobu Minagawa et al

It is certified that error appears in the above-identified patent and that said Letters Patent are hereby corrected as shown below:

Column 59, Control 4 : 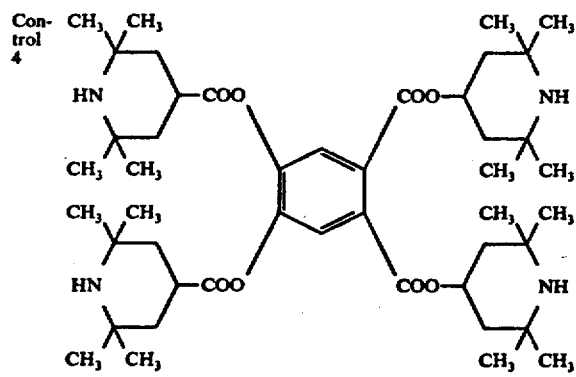

should be

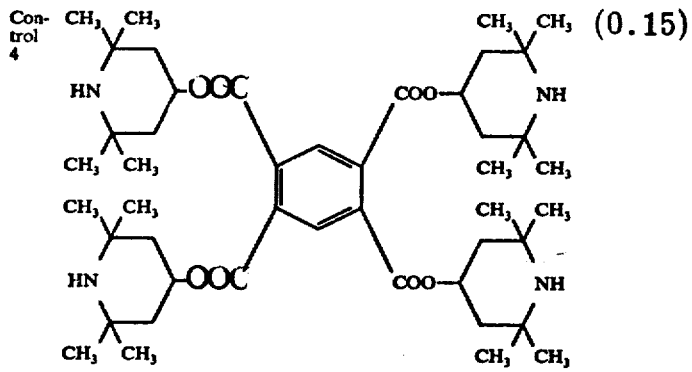 (0.15)

UNITED STATES PATENT AND TRADEMARK OFFICE
CERTIFICATE OF CORRECTION

PATENT NO. : 4,110,306
DATED : August 29, 1978
INVENTOR(S) : Motonobu Minagawa et al It is certified that error appears in the above-identified patent and that said Letters Patent are hereby corrected as shown below:

Column 61, Example 41 :

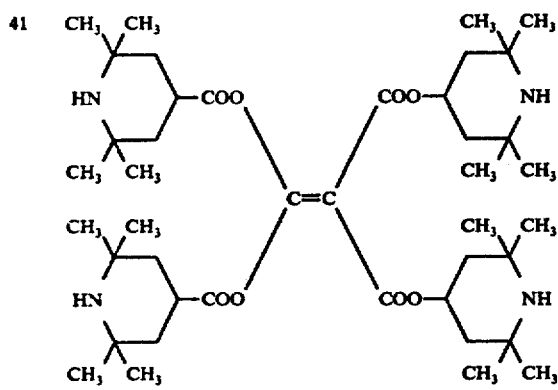

should be

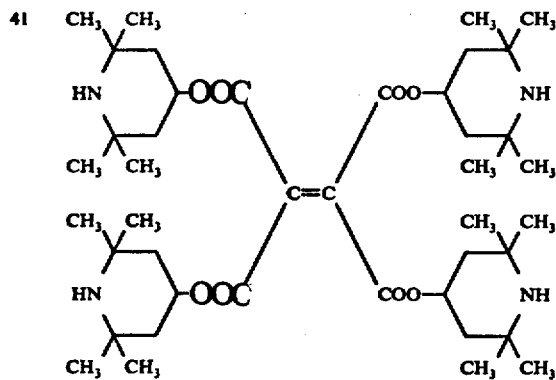

UNITED STATES PATENT AND TRADEMARK OFFICE
CERTIFICATE OF CORRECTION

PATENT NO. : 4,110,306
DATED : August 29, 1978
INVENTOR(S) : Motonobu Minagawa et al It is certified that error appears in the above-identified patent and that said Letters Patent are hereby corrected as shown below:

Column 61, Example 42 :

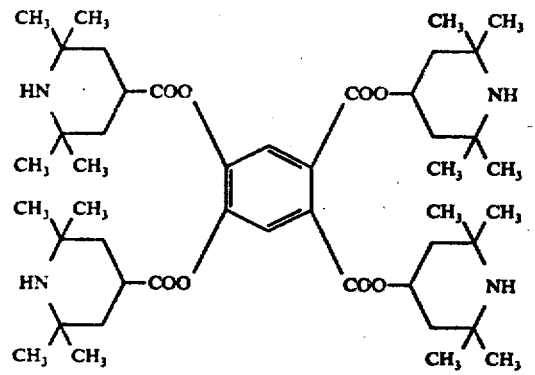

should be

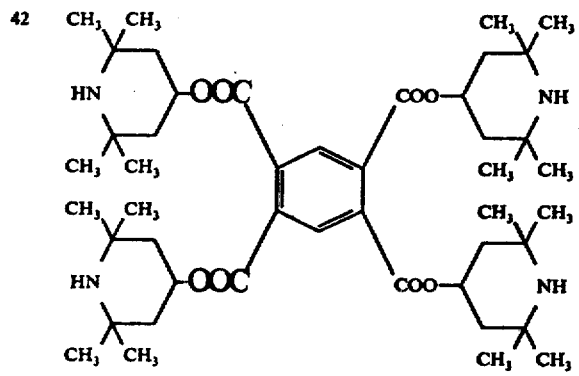

UNITED STATES PATENT AND TRADEMARK OFFICE
CERTIFICATE OF CORRECTION

PATENT NO. : 4,110,306

DATED : August 29, 1978

INVENTOR(S) : Motonobu Minagawa et al

It is certified that error appears in the above-identified patent and that said Letters Patent are hereby corrected as shown below:

Column 65, line 16 : "30" should be --thirty--

Column 65, lines 21-31 :

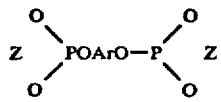
25 or

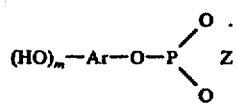
30 should be

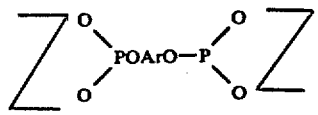
25 or

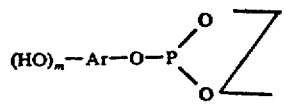
30

UNITED STATES PATENT AND TRADEMARK OFFICE
CERTIFICATE OF CORRECTION

PATENT NO. : 4,110,306

DATED : August 29, 1978

INVENTOR(S) : Motonobu Minagawa et al

It is certified that error appears in the above-identified patent and that said Letters Patent are hereby corrected as shown below:

Column 66, line 30 : "acrylonitrille" should be --acrylonitrile--

Signed and Sealed this

Twenty-ninth Day of January 1980

[SEAL]

Attest:

SIDNEY A. DIAMOND

Attesting Officer     Commissioner of Patents and Trademarks